United States Patent [19]

van der Lely

[11] 4,084,485
[45] Apr. 18, 1978

[54] DRIVING MECHANISMS AND HOUSINGS FOR SUCH MECHANISMS

[75] Inventor: Cornelis van der Lely, Zug, Switzerland

[73] Assignee: C. van der Lely N.V., Maasland, Netherlands

[21] Appl. No.: 588,140

[22] Filed: Jun. 19, 1975

[30] Foreign Application Priority Data

Jun. 25, 1974  Netherlands .................... 7408501

[51] Int. Cl.² ............................................. F01B 15/04
[52] U.S. Cl. ........................................ 91/210; 91/197; 91/414; 92/68; 92/76
[58] Field of Search .................. 91/411 R, 414, 197, 91/211, 176, 186, 210, 494, 495; 92/76, 12.1, 66, 68

[56] References Cited

U.S. PATENT DOCUMENTS

| | | | |
|---|---|---|---|
| 975,486 | 11/1910 | Waltman | 91/186 |
| 1,004,504 | 9/1911 | Van Nette | 92/76 |
| 2,928,381 | 3/1960 | MacDonald | 91/186 |
| 3,016,047 | 1/1962 | MacDonough | 91/210 |
| 3,568,575 | 3/1971 | Hagen | 92/76 |
| 3,656,405 | 4/1972 | Klinkhammer | 91/176 |
| 3,730,055 | 5/1973 | Schluter | 92/28 |
| 3,915,064 | 10/1975 | Dancs | 91/414 |

FOREIGN PATENT DOCUMENTS

| | | | |
|---|---|---|---|
| 2,432,170 | 1/1975 | Germany | 91/197 |
| 8,255 of | 1897 | United Kingdom | 91/176 |

Primary Examiner—Alan Cohan
Assistant Examiner—Abraham Hershkovitz

[57] ABSTRACT

A driving mechanism for a vehicle wheel includes a housing and piston-cylinder assemblies pivoted to side plates of the housing. Each assembly communicates with hydraulic fluid under pressure and a reciprocating piston rod of each assembly drives a pinion through a surrounding eccentric and driving ring when the assembly is rocked about its pivot connection. The assemblies with corresponding pinions are located around and in mesh with the outer periphery of a central pinion that is fixed to an output shaft to rotate the wheel. As each assembly rocks, a sliding valve within a control valve housing opens and closes return and inlet fluid ducts. An anchorage links each sliding valve to the housing for the mechanism. The latter housing affords the connection between the wheel and the vehicle frame and includes two spaced apart plates with strips between the plates that leave upper and lower blocks. The blocks hold king pins for steering the wheels and comprise duct means for inlet and return ducts to each assembly.

27 Claims, 12 Drawing Figures

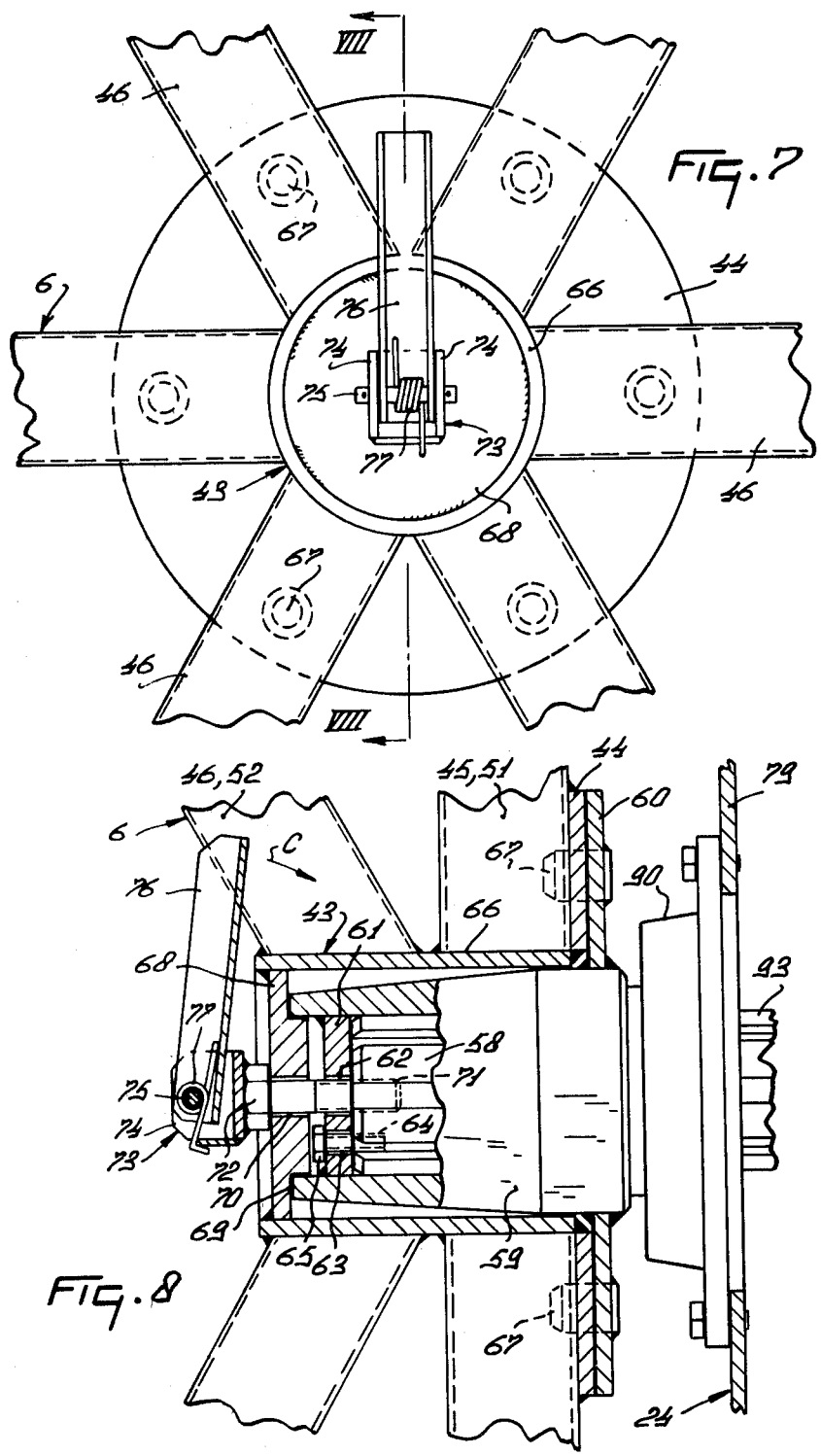

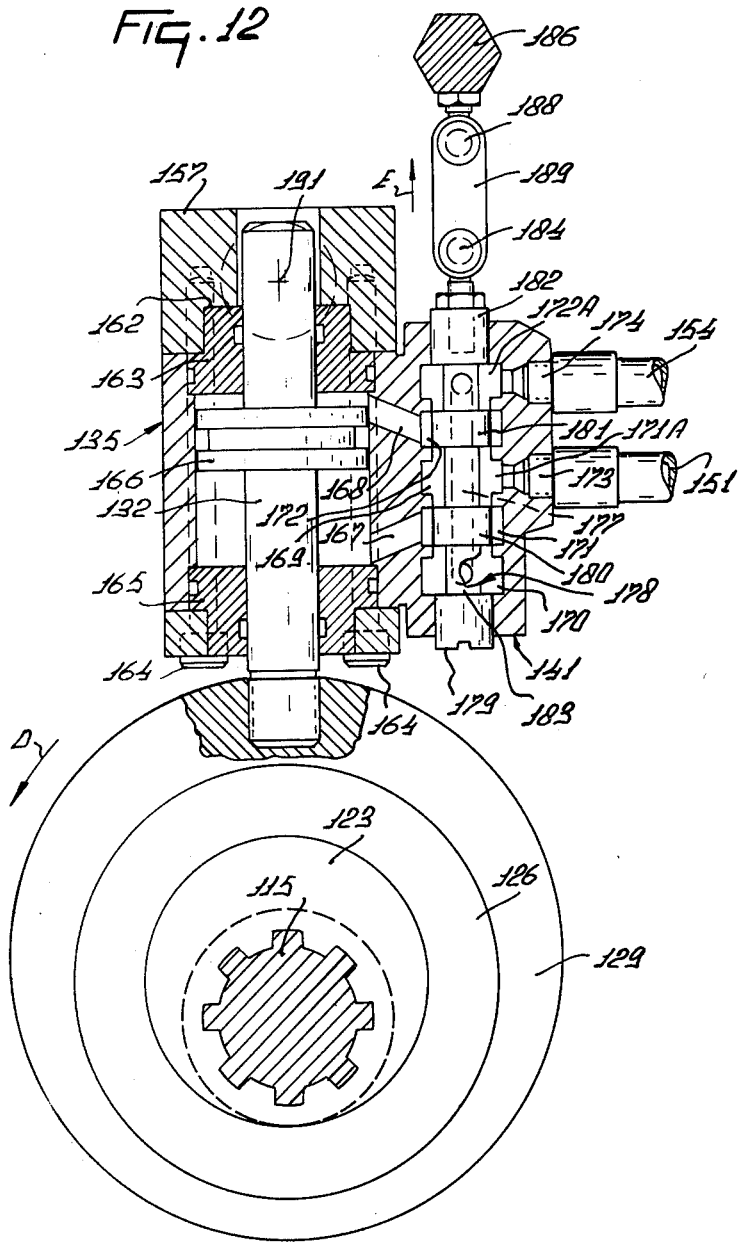

DRIVING MECHANISMS AND HOUSINGS FOR SUCH MECHANISMS

BRIEF DESCRIPTION OF THE DRAWINGS

For a better understanding of the invention, and to show how the same may be carried into effect, reference will now be made, by way of example, to the accompanying drawings, in which:

FIG. 7 is a view as seen in the axial direction of the wheel of either FIG. 5 or FIG. 6, FIG. 8 is a section taken on the line VIII—VIII in FIG. 7, FIG. 12 is a section taken on the line XII—XII in FIG. 11.

DESCRIPTION OF THE PREFERRED EMBODIMENTS

Figure 1:
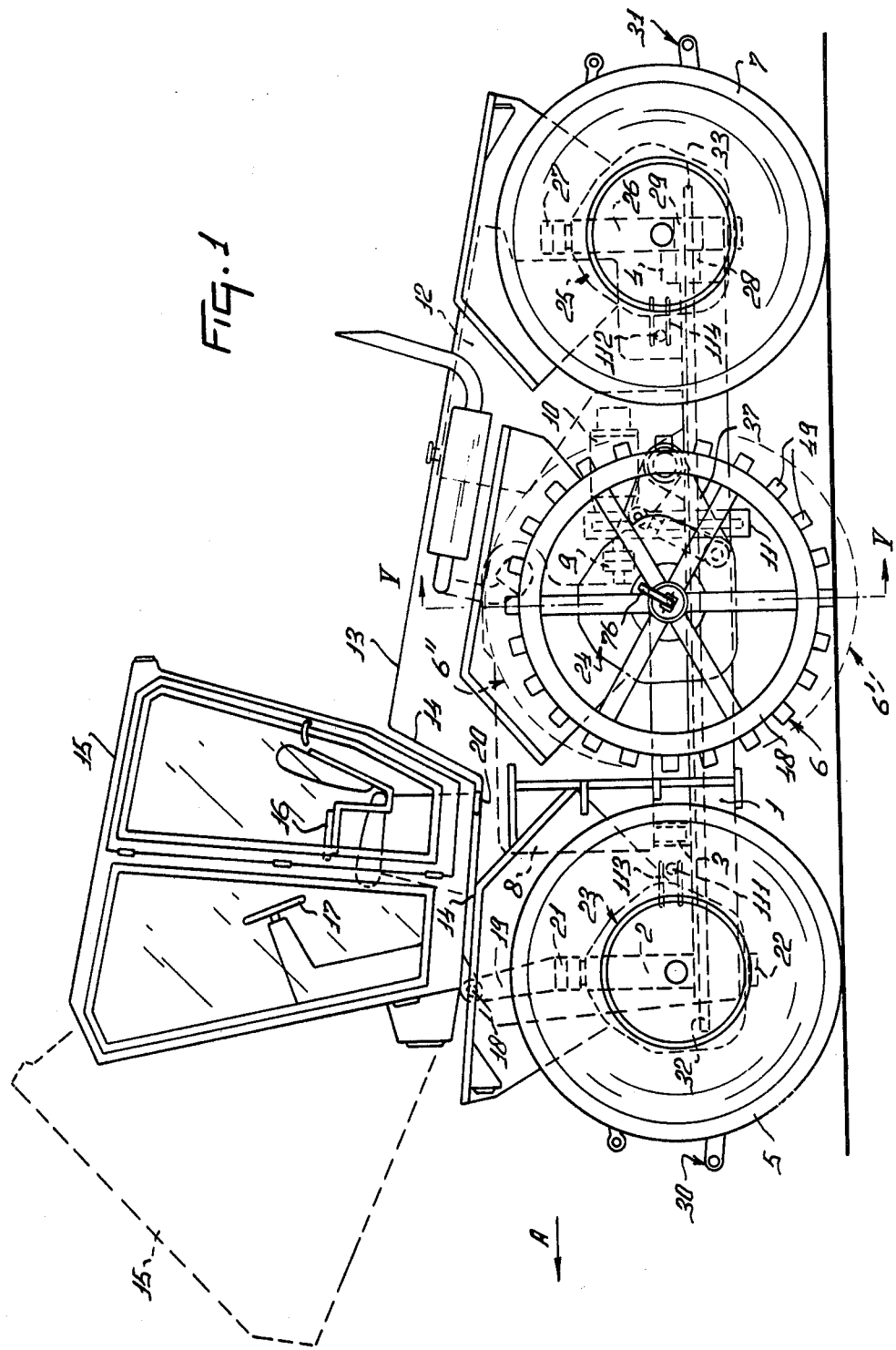
FIG. 1 is a side elevation of a six-wheeled tractor, each of the six wheels of which has a corresponding driving mechanism in accordance with the invention.
Figure 2:
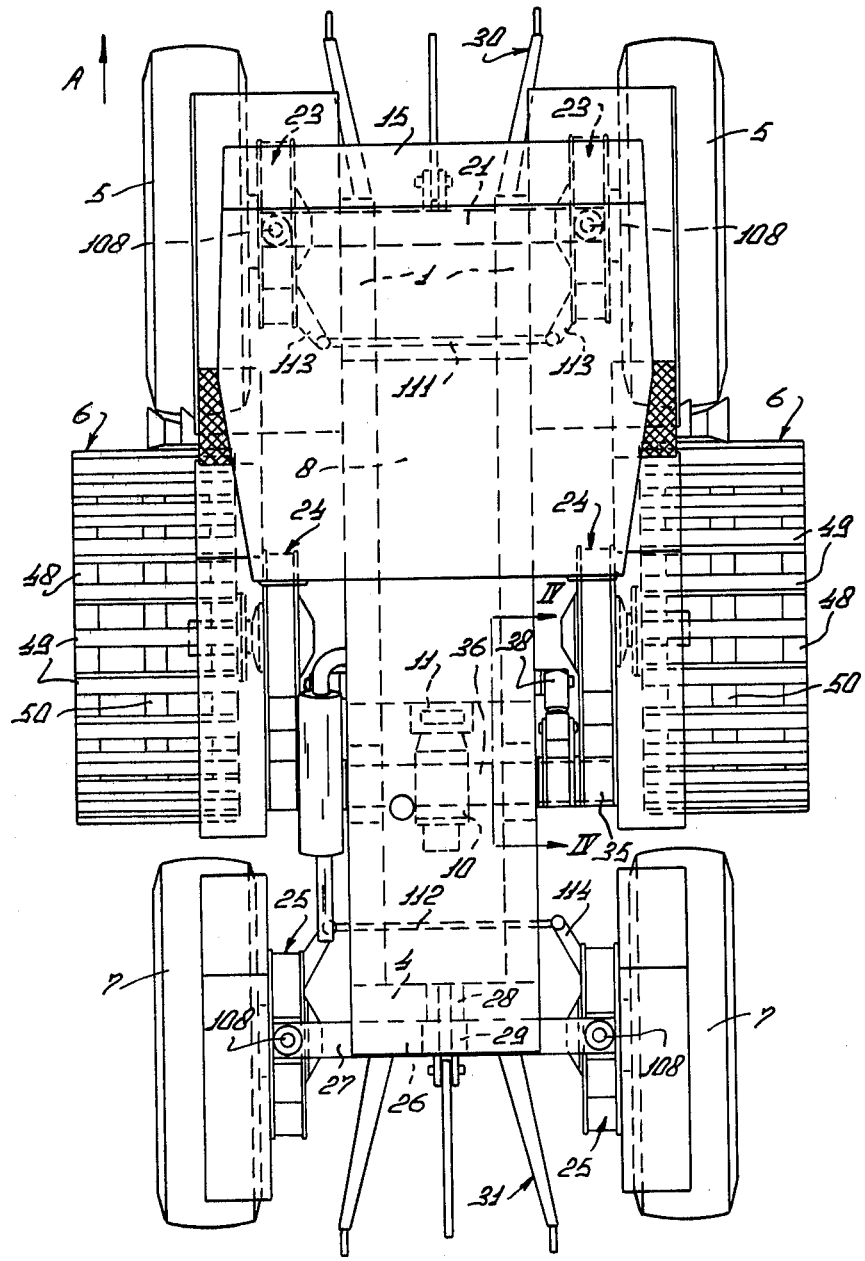
FIG. 2 is a plan view of the tractor of FIG. 1.
Figure 3:
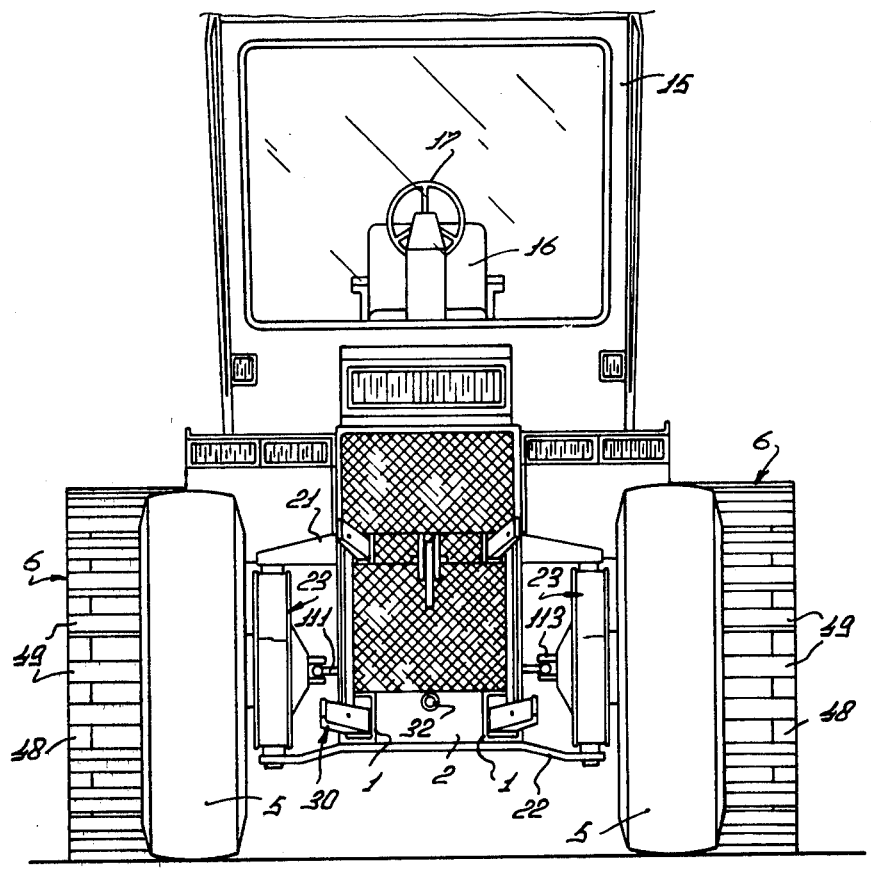
FIG. 3 is a front elevation of the tractor.

Referring to the drawings, and particularly to FIGS. 1 to 3 thereof, the tractor that is illustrated, and which includes six driving mechanisms in accordance with the invention, comprises two hollow substantially parallel frame beams 1 that extend in the intended direction of straight forward travel of the tractor which is indicated by an arrow A in FIGS. 1 and 2 of the drawings. The two frame beams 1 are interconnected, near their leading ends, by a hollow sheet metal structure 2 having a height which is substantially 70% greater than the magnitude of the spacing between the two beams 1, by two motor supports 3 (one of which is visible in FIG. 3) and by a horizontal tie beam 4 that extends substantially horizontally perpendicular to the direction A and parallel to the structure 2 at a location close to the rearmost ends of the two beams 1. The opposite sides of the tractor are each supported by three ground wheels that are located one behind the other in the direction A. There is a pair of front ground wheels 5, a pair of center ground wheels 6 and a pair of rear ground wheels 7 but each of the front wheels 5 and/or each of the rear wheels 7 may comprise two wheels mounted closely alongside one another. All of the wheels 5, 6 and 7 have substantially the same diameter which it is preferred should amount to substantially 150 centimeters. When the tractor is disposed for straight travel, the distance between the axis of rotation of the front wheels 5 and the axis of rotation of the central wheels 6 is substantially the same as the distance between the axis of rotation of the central wheels 6 and the axis of rotation of the rear wheels 7. As seen in side elevation (FIG. 1), the axis of rotation of the front wheels 5 substantially coincides with the position of the hollow sheet metal structure 2 which interconnects the frame beams 1 near their leading ends. Again as viewed in FIG. 1 of the drawings, the axis of rotation of the central wheels 6 is located, with reference to the direction A, substantially at the rear end of a diesel engine or other driving engine 8 and substantially at the location of rear supports of that engine. The axis of rotation of the rear wheels 7, as seen in FIG. 1 of the drawings, is located immediately to the rear of the tie beam 4. The front of the driving engine 8 bears upon the supports 3 and that engine is located substantially wholly between the axis of rotation of the front wheels 5 and that of the central wheels 6. A rear output shaft of the engine 8 is provided with a hydraulic or mechanical clutch 9 that is controllable by the driver of the tractor and its output side drives a hydraulic pump 10 disposed behind the clutch 9. The clutch 9 can drive the pump 10 directly or through the intermediary of a gear wheel transmission 11. A fuel tank 12 is mounted behind the engine 8 so as to lie principally between the axis of rotation of the central wheels 6 and the axis of rotation of the rear wheels 7 as seen in plan view (FIG. 2).

The engine 8 and the fuel tank 12 are partly covered by a metal sheet 13 which is formed with a depression 14 that is located, with respect to the direction A, substantially in register with the fronts of the two central ground wheels 6. The depression 14 receives the bottom of a driving cabin 15 which is a closable cabin that contains a driving seat 16, a steering wheel 17 and controls for the other functions of the tractor, which controls it is not necessary to describe or illustrate for the purposes of the present invention. The cabin 15 is pivotably connected to the frame of the tractor by a substantially horizontal pivot shaft 18 which is perpendicular to the direction A and which is located beneath the bottom of the cabin 15 and at the front thereof with respect to the direction A. The pivot shaft 18 is carried by two supports 19 which project upwardly from the top of the structure 2 in the manner which can be seen in FIG. 1 of the drawings. A rear region of the bottom of the cabin 15 is provided with rubber or other resilient supports 20 and latches which are not shown in the drawings are provided near the supports 20, at both sides of the cabin 15, to prevent the cabin 15 from tilting about the axis defined by the shaft 18 unless such tilting is desired. When the latches are released, the cabin 15 and its contents can be tilted forwardly in an counterclockwise direction as seen in FIG. 1 of the drawings about the axis defined by the pivot shaft 18 into substantially the position that is shown in broken lines in FIG. 1. Access to the depression 14 is then readily possible and two covers (not shown in the drawings) are then removable to obtain access to the interior of the compartment which contains the engine 8.

The top of the hollow sheet metal structure 2 is provided with an upper support 21 which is arranged symmetrically with respect to a vertical plane of substantial symmetry of the tractor that extends parallel to the direction A, opposite end regions of the upper support 21 projecting laterally beyond the corresponding ends of the structure 2. A lower support 22 is carried by the bottom of the structure 2 and by the bottoms of the two frame beams 1 and, like the upper support 21, is also substantially symmetrical with respect to the plane which has just been mentioned, the lower support 22 also projecting laterally beyond the structure 2 at its opposite ends to the same extent as does the upper support 21. Two wheel motors 23 are pivotably mounted between the opposite projecting ends of the upper and lower supports 21 and 22, said wheel motors 23 thus being located at opposite sides of the tractor and in substantially symmetrical relationship with the aforementioned vertical plane of substantial symmetry of the tractor that extends parallel to the direction A. The two wheel motors 23 are, of course, located at the internal sides of the corresponding front wheels 5. The two central wheels 6 have two similarly disposed wheel motors 24 and the rear wheels 7 have two further similarly arranged wheel motors 25, said rear wheel motors 25 being carried by a hollow sheet metal structure 26 of parallelepiped shape which is connected to the tractor frame at the rear thereof. The structure 26 has an upper support 27 and a matching lower support, whose opposite projecting ends of which pivotably carry the two rear wheel motors 25. However, while the structure 2 is rigidly connected to the frame beams 1, the similarly dimensioned structure 26 is connected to the frame so as to be pivotable relative thereto about a substantially horizontal axis that is parallel to the direction A. The rear wheel motors 25 and the rear wheels 7 are thus freely pivotable about that axis relative to the frame. To this end, a horizontally disposed tubular support 28 is carried by the tie beam 4 midway across the width of the tractor in such a position that part of the length of the support 28 projects rearwardly beyond the tie beam 4. This rearwardly projecting portion is surrounded by a bearing 29 that is rigidly secured to the rear structure 26 thus allowing that structure and the parts which it carries to turn about the horizontal fore and aft axis of the tubular support 28.

The front of the tractor is provided with a three-point lifting device or hitch 30 and the rear thereof is provided with a second three-point lifting device or hitch 31. Both of the devices or hitches 30 and 31 are capable of hydraulic actuation in a manner which is known per se and which is not illustrated in detail in the drawings. The tractor also has a front power take-off shaft 32 and a rear power take-off shaft 33 with axes of rotation which are coincident and are contained in the aforementioned vertical plane of substantial symmetry of the tractor that extends parallel to the direction A. The two power take-off shafts 32 and 33 are located at the level of the tops of the two frame beams 1 and are selectively drivable, in accordance with the settings of controls within the cabin 15, from the engine 8 by way of the clutch 9 and the gear wheel transmission 11. The driver of the tractor can vary the transmission ratio provided by the gear wheel transmission 11 in such a way that the speed of rotation of the output shaft of the engine 8 remains the same while different speeds of rotation of either or both of the two power takeoff shafts 32 and 33 can be selected.

The front ground wheels 5 are substantially immovable upwardly and downwardly with respect to the tractor frame and the rear ground wheels 7 are rockable relative to that frame about the substantially horizontal fore and aft axis of the tubular support 28. The central wheels 6 are, however, mounted in a different manner which is shown in detail in FIG. 4 of the drawings. Support lugs 34 are secured to the tops of the frame beams 1 at locations behind the axis of rotation of the wheels 6 with respect to the direction A. Each support lug 34 carries a corresponding horizontal bearing 35 and a connecting element in the form of a supporting tube 36 is freely turnably mounted in the two bearings 35. The longitudinal axis of the tube 36 extends substantially horizontally perpendicular to the direction A and its length is such that it projects beyond the frame beams 1 at both sides of the tractor. In fact, the projecting ends of the tube 36 are contained in planes which substantially coincide with the general planes of the inner sides of the two central wheel motors 24. Both the inner and outer side plates of each wheel motor 24 have rearwardly projecting lugs 37 that are in substantially vertically disposed and substantially parallel relationship, opposite end portions of the supporting tube 36 being rigidly secured to the two lugs 37 of each pair. The wheel motors 24 and the central ground wheels 6 which they rotatably carry are thus connected to the tube 36 in such a way that an angular displacement of that tube about its own longitudinal axis will cause them to be raised or lowered relative to the tractor frame. The cylinders 38 of two hydraulic or pneumatic piston and cylinder assemblies are turnably connected to the two frame beams 1 by substantially horizontal pivots 39 at locations between the two central wheel motors 24 and the corresponding frame beams 1 (see FIG. 2), said assemblies extending obliquely upwardly and rearwardly from their pivots 39 and having the free ends of their piston rods 40 pivotably connected by strong pins 41 to the free ends of pairs of short arms 42 that are rigidly secured to the tube 36 between the frame beams 1 and the corresponding pairs of lugs 37. The axes defined by the pivots 39 and the pins 41 are parallel to one another and to the longitudinal axis of the tube 36 and the cylinders 38 are freely turnable about the pivots 39. Although two hydraulic or pneumatic piston and cylinder assemblies have been described and illustrated, a single appropriately positioned assembly may, if preferred, be employed. The hydraulic or pneumatic piston and cylinder assemblies are double-acting assemblies and, upon actuating them so as to extend their piston rods 40 from their cylinders 38, the tube 36 will be turned about its own longitudinal axis in the direction indicated by an arrow B in FIG. 4 of the drawings thus turning the central wheel motors 24 and the central ground wheels 6 upwardly relative to the tractor frame in a similar direction. Upon actuating the assemblies to withdraw the piston rods 40 into the cylinders 38, turning movement in a direction opposite to the direction B will result thus moving the central ground wheels 6 downwardly towards the ground surface. When the axis of rotation of the central ground wheels 6 is at the same horizontal level as the axes of rotation of the front ground wheels 5 and rear ground wheels 7, the piston rods 40 of the two assemblies occupy intermediate positions relative to the cylinders 38 which are midway between positions of maximum extension and maximum withdrawal. Accordingly, under such circumstances, the central wheels 6 can be urged either downwardly towards the ground surface or be raised upwardly away therefrom.

Figure 5:
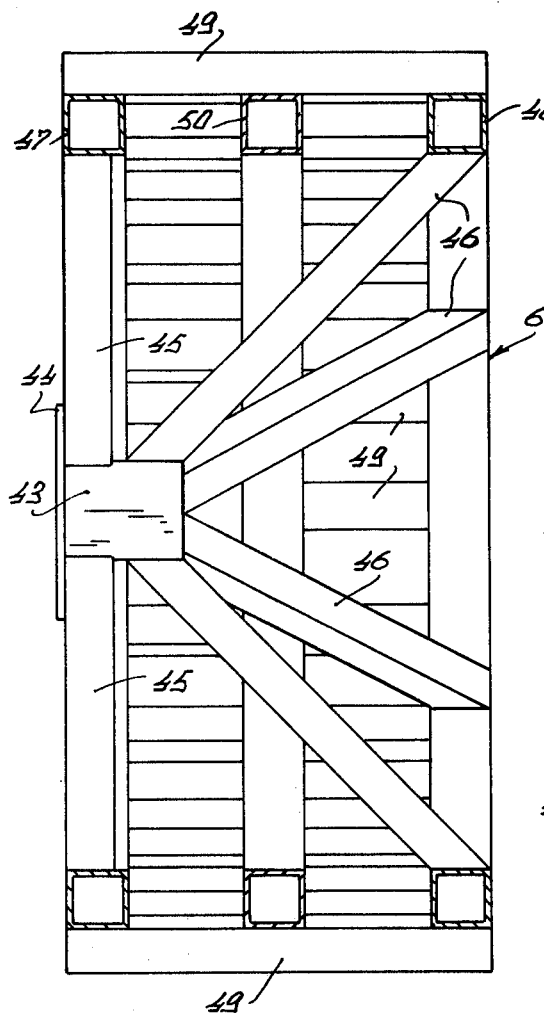
FIG. 5 is a section, to an enlarged scale, taken on the line V—V in FIG. 1.
Figure 10:
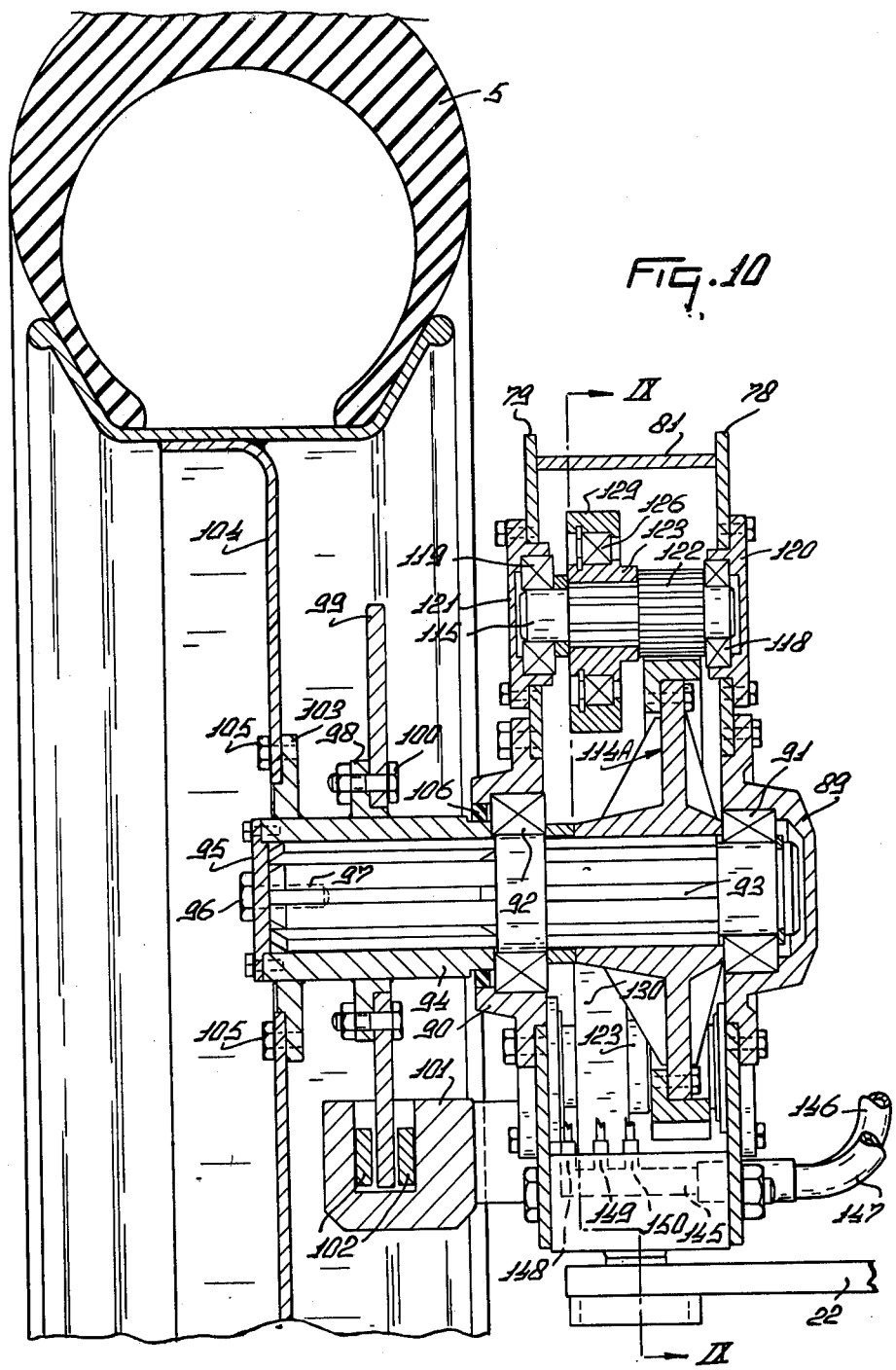
FIG. 10 is a section taken on the line X—X in FIG. 9 and shows the same driving mechanism and part of the corresponding wheel.

All of the front and rear ground wheels 5 and 7 are identical having steel rims upon wich pneumatic tires are mounted in a manner which is conventional for tractors (see FIG. 10 of the drawings). The central ground wheels 6 may be similar pneumatically tired wheels but they are readily exchangeable for wheels of other kinds. FIG. 5 of the drawings illustrates the provision of a so-called cage wheel which has a hub 43, the construction of which will be further described below. The end of the hub 43 which coincides with the internal side of the cage wheel is provided with a circular end plate 44 that is welded to the hub and to the wheel, the general plane of the end plate 44 being perpendicular to the axis of rotation of the wheel and its center being coincident with that axis. A plurality of radial spokes 45, of which there are six in the illustrated embodiment, are welded to the hub 43 so as to radiate therefrom. Each spoke 45 is a hollow beam of square cross-section and, where it abuts against the outwardly facing side of the end plate 44, it is also welded to that end plate. The inner ends of a plurality of spokes 46 that are directed towards the outer side of the cage wheel are also welded to the hub 43, the inclined spokes 46 also being afforded by hollow beams or tubes of square cross-section. The longitudinal axes of the spokes 46 are contained in an imaginary conical surface whose apex is coincident with the axis of rotation of the central cage wheel 6. The ends of both the spokes 45 and the spokes 46 that are remote from the hub 43 are contained in the surface of an imaginary right circular cylindrical figure having a longitudinal axis which coincides with the axis of rotation of the wheel 6. The outer ends of the radial spokes 45 are rigidly interconnected by a circular inner (with respect to the inner and outer sides of the wheel) felly 47 that is afforded by a hollow circular beam of square cross-section. The outer ends of the inclined spokes 46 are similarly rigidly interconnected by an outer felly 48 that is of the same size and formation as the inner felly 47, the centers of curvature of the two fellies 47 and 48 being coincident with the axis of rotation of the wheel 6 and planes which contain the center lines of the beams by which they are afforded being perpendicular to said axis. The outer surfaces of the two fellies 47 and 48 are both coincident with the surface of an imaginary right circular cylindrical figure, the longitudinal axis of which coincides with the axis of rotation of the wheel 6. Said outer surfaces are also interconnected, at regular intervals, by a plurality, such as 24, of treads 49, each tread 49 being afforded by a hollow beam of square cross-section, the longitudinal axis of which is parallel to the axis of rotation of the wheel 6. It will be apparent from FIG. 5 of the drawings that the inner surfaces of the treads 49 are also substantially coincident with the surface of the imaginary right circular cylindrical figure that has just been mentioned. The treads 49 are spaced apart from one another at regular angular intervals around the axis of rotation of the wheel 6 and, in addition to the fellies 47 and 48, they are also interconnected by a central felly 50 which is of identical size and construction to the fellies 47 and 48 and which is located midway between those two fellies. The inner sides of the treads 49 are welded to the outer surfaces of all three of the parallel fellies 47, 48 and 50. The opposite ends of the treads 49 are contained in the same planes as are the inner side of the inner felly 47 and the outer side of the outer felly 48 respectively, the overall diameter of the wheel 6 being the same as the overall diameters of the pneumatically tired front and rear wheels 5 and 7. As previously mentioned, said diameter preferably has a value of substantially 150 centimeters. The width (axial length) of the central cage wheel 6 that is shown in FIG. 5 of the drawings is substantially twice the same dimension of one of the front wheels 5 or one of the rear wheels 7 and should be between 30 and 60% of the overall diameter of the wheel, a value of substantially 50% being preferred.

Figure 6:
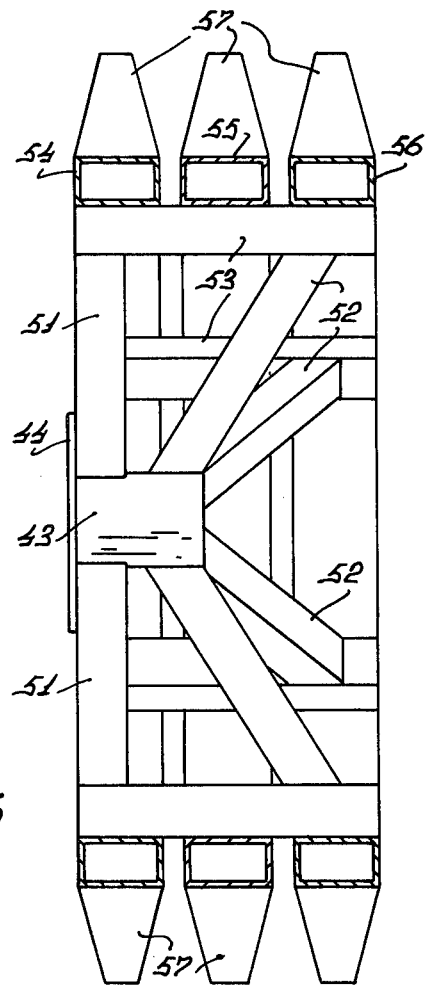
FIG. 6 is a similar view to that of FIG. 5 but illustrates an alternative wheel construction.

FIG. 6 of the drawings illustrates an alternative construction for one of the central ground wheels 6. In the embodiment of FIG. 6, the hub 43 and end plate 44 are provided with a plurality of radial spokes 51 that are identical to the spokes 45 of FIG. 5 except that they are shorter in length. The wheel of FIG. 6 also comprises a plurality of inclined spokes 52 that are of similar formation to the inclined spokes 46 of FIG. 5 but that are somewhat shorter in length and that have their longitudinal axes contained in the surface of an imaginary conical figure of somewhat larger cone angle than the corresponding imaginary figure associated with the spokes 46. The outer ends of the spokes 51 and 52 are contained in the surface of an imaginary right circular cylindrical figure with a longitudinal axis which coincides with the axis of rotation of the ground wheel of FIG. 6. In fact, the outer ends of pairs of the spokes 51 and 52 are rigidly interconnected by hollow supporting beams 53 of square cross-section, the longitudinal axes of which extend parallel to the axis of rotation of the wheel and are contained in the surface of an imaginary right circular cylindrical figure with a longitudinal axis coinciding with that axis of rotation. An inner felly 54, a central felly 55 and an outer felly 56 have their inner surfaces welded to the outer surfaces of the beams 53 and it will be seen from FIG. 6 of the drawings that each of the three circular fellies 54, 55 and 56 is afforded by a hollow beam of oblong cross-section, the disposition being such that the longer sides of the cross-sections extend parallel to the axis of rotation of the wheel. The outer surfaces of the three fellies 54, 55 and 56 are contained in the surface of a further imaginary right circular cylindrical figure having a longitudinal axis which coincides with the axis which of rotation of the wheel.

In a comparison between the embodiments of FIGS. 5 and 6 of the drawings, it will be noted that, in FIG. 5, the spokes 45 and 46 are directly secured to the fellies 47 and 48 and that the treads 49 are located radially outwardly of all three of the fellies 47, 48 and 50, whereas, in FIG. 6, the spokes 51 and 52 are secured to the beams 53 (which are structurally equivalent to the treads 49), the fellies 54, 55 and 56 being located radially outwardly of the beams 53 which beams indirectly connect those fellies to the spokes 51 and 52. The wider sides of the oblong cross-section beams which afford the fellies 54, 55 and 56 face the ground surface and have widths in directions parallel to the axis of rotation of the ground wheel that are substantially 50% greater than the corresponding widths of the fellies 47, 48 and 50 of the embodiment of FIG. 5. Only narrow annular gaps are left between the fellies 54/55 and 55/56. The outer ground-contacting surfaces of the three fellies 54, 55 and 56 are provided with extensions in the form of substantially pyramid-shaped steel teeth 57, the teeth 57 thus being arranged in three circular rows around the periphery of the wheel. If preferred, the extensions may be in the form of rings secured to the outer curved surfaces of the fellies 54, 55 and 56, each ring having its center of curvature coincident with the axis of rotation of the wheel and being formed with two outwardly convergent bevelled side surfaces so as to give a cross-sectional configuration generally similar to the elevational view of the teeth 57 that appears in FIG. 6. The radially outermost surfaces of the teeth 57, or of the equivalent rings, determine the overall diameter of the wheel in FIG. 6 and that overall diameter is, once again, equal to the overall diameter of one of the pneumatically tired front or rear ground wheels 5 or 7. It will thus be understood that the central wheels 6 of the tractor may be identical to the pneumatically tired front and rear wheels 7 thereof, may be the cage wheels of FIG. 5 or the alternative wheels of FIG. 6.

In order that the ground wheels 5, 6 and 7 should be capable of being quickly changed in the event of a puncture or when the use of alternative central ground wheels 6 is required, the hubs 43 of those ground wheels may be constructed in the manner that is illustrated in detail in FIGS. 7 and 8 of the drawings. Although the use of the construction shown in FIGS. 7 and 8 is not essential, it is particularly desirable that output shafts 58 of the wheel motors 24 corresponding to the central wheels 6 should be constructed for co-operation with the hubs 43 to facilitate rapid changing of the central wheels 6. The construction that is about to be described with reference to FIGS. 7 and 8 of the drawings is also advantageously used in association with the front and rear ground wheels 5 and 7. The illustrated output shaft 58 is splined for co-operation with matching internal splines in a sleeve 59. Part of the length of the sleeve 59 is of frusto-conical configuration and the end of that part that is closer to the corresponding wheel motor is the end of larger diameter. The frusto-conical part of the sleeve 59 integrally adjoins an axially shorter right circular cylindrical part at its greater diameter end and said cylindrical part has the internal edge of an annular plate 60 welded to it in surrounding relationship, the plate 60 being in perpendicular relationship with the longitudinal axis of the sleeve 59 with its center point coincident with that axis. The end of the sleeve 59 that is remote from the plate 60 and that is of the smallest diameter has a cover 61 perpendicularly welded to its internal curved surface at a location spaced a short distance inwardly from the true end. The cover 61 is formed with a central screw-threaded bore 62 and with a second screw-threaded bore 63 that is spaced eccentrically from the boar 62 towards the internal surface of the sleeve 59. The free end of the output shaft 58 which faces the cover 61 is formed with a screw-threaded blind bore 64 that is spaced eccentrically from the longitudinal axis of the shaft 58 by the same distance as is the bore 63 from the center of the cover 61. The sleeve 59, plate 60 and cover 61 can be fixed in place relative to the output shaft 58 by placing the second screw-threaded bore 63 and the blind bore 64 in alignment and screwing the shank of a bolt 65 through the second bore 63 and into the blind bore 64.

The hub 43 of the co-operating central wheel 6 (as shown in FIGS. 7 and 8) comprises a right circular cylindrical sleeve 66 having one end welded to the end plate 44 of the wheel. The annular plate 60 that is welded to the sleeve 59 has a plurality of locating dowels 67 rigidly seucred to it in such a way that said dowels 67 all project from the side of the plate 60 that faces outwardly away from the corresponding wheel motor 24. The longitudinal axes of the dowels 67 are parallel to the longitudinal axis of the sleeve 59 and said dowels are arranged to co-operate with holes that are formed through the wheel end plate 44 in closely fitting relationship. As can be seen from FIG. 7 of the drawings, with the previously described six radial spokes 45 or 51, there are six dowels 67 and six co-operating holes. The end of the sleeve 66 that is remote from the end plate 44 is provided, just inside its mouth, with a cover 68 which is fixed in position by welding. The inner surface of the cover 68 has a circular shoulder 69 which just fits inside the mouth of the smaller diameter end of the frusto-conical part of the sleeve 59. When the illustrated wheel 6 is mounted on the illustrated output shaft 58, the shoulder 69 of the cover 68 just fits snugly inside the mouth of the sleeve 59 at the smaller diameter end of the frusto-conical part thereof. Under these conditions, the flat surface of the cover 68 that is located inside the mouth of the sleeve 59 is spaced from the facing flat surface of the cover 61 that is welded to said sleeve 59 by a short distance which is sufficient to accommodate the head of the bolt 65.

The cover 68 has a central screw-threaded bore 70 which is in line with the screw-threaded bore 62 through the cover 61 and in line with a screw-threaded bore 71 that is formed axially in the output shaft 58 itself. When the wheel 6 has been mounted in its operative position, that position is maintained by screwing a central retaining bolt 72 inwardly through the bores 70, 62 and 71 until the head of said bolt 72 bears firmly against the cover 68 around the bore 70. The wheel 6 is then clamped tightly and correctly to the output shaft 58. The head of the central retaining bolt 72 has the base of part of a latching member 73 welded to it, said part also including two spaced plates 74 that are parallel to each other and to the longitudinal axis of the bolt 72. A pivot pin 75 perpendicularly interconnects the plates 74 at right angles to the longitudinal axis of the bolt 72 and a latching lever 76 of channel-shaped cross-section has one of its ends turnably mounted on the pivot pin 75, that pin extending perpendicularly through the limbs of the channel in parallel relationship with its web or base. As will be evident from FIGS. 7 and 8 of the drawings, the limbs of the latching lever 76 lie between the two plates 74. A coil spring 77 is wound around the pivot pin 75 between the limbs of the lever 76 and has one of its ends bearing against the web or base of that lever and its opposite end in hooking engagement with a plate that perpendicularly interconnects the two plates 74. The coil spring 77 is pre-stressed so as to tend to unwind in a direction which will turn the lever 76 in a direction indicated by an arrow C in FIG. 8 of the drawings, that is to say, in a direction which is such that the end of the lever 76 remote from the pivot pin 75 is urged resiliently towards the inclined wheel spokes 46 or 52. The bolt 72 is tightened to an extent which is such that the end of the latching lever 76 which is remote from the pivot pin 75 will engage between two of the spokes 46 or 52 as illustrated in FIGS. 7 and 8 of the drawings and it will be realised that this positive engagement prevents loosening of the bolt 72 until the lever 76 is turned manually about the pin 75 in a direction opposite to the direction C to bring it clear of engagement with the spokes 46 or 52. The construction of the latching member 73 is sufficiently strong to enable the lever 76 to be used as a tightening or loosening tool for the bolt 72 when it is turned outwardly about the pin 75 against the action of the spring 77 in the manner which has just been described. When the wheel 6 that is shown by way of example in FIGS. 7 and 8 of the drawings is to be removed and a pneumatically tired wheel equivalent to one of the front wheels 5 or rear wheels 7 is to be substituted, the sleeve 59, the plate 60 and the cover 61 can be withdrawn from the output shaft 58 by temporarily removing the bolt 65. Even when a frequent interchange of central wheels 6 of the two different kinds that have been described with reference to FIGS. 5 and 6 of the drawings occurs, the output shaft 58 is protected from mud and the like by the surrounding sleeve 59 and cover 61 and the matching splines on the shaft 58 and inside the sleeve 59 cannot become damaged by such wheel exchanges.

The construction and operation of the six wheel motors 23, 24 and 25 will be described with reference to FIGS. 9 to 12 of the drawings which illustrate one of the pair of front wheel motors 23. It is, however, emphasized that all six of the wheel motors 23 to 25 are essentially alike. There are small differences in the shapes of their housings to match the shapes of neighboring parts and because the front and rear wheel motors 23 and 25 that are associated with the front and rear steerable ground wheels 5 and 7 are pivotably mounted relative to the supports that have been described whereas the central wheel motors 24 that are associated with the non-steerable central ground wheels 6 are movable upwardly and downwardly about a substantially horizontal axis with the aid of the assemblies that have been described with particular reference to FIG. 4 of the drawings but are not steerably displaceable about substantially vertical axes. Apart from these differences in shape and mounting, the construction and operation of all six of the wheel motors 23, 24 and 25 are identical.

Figure 9:
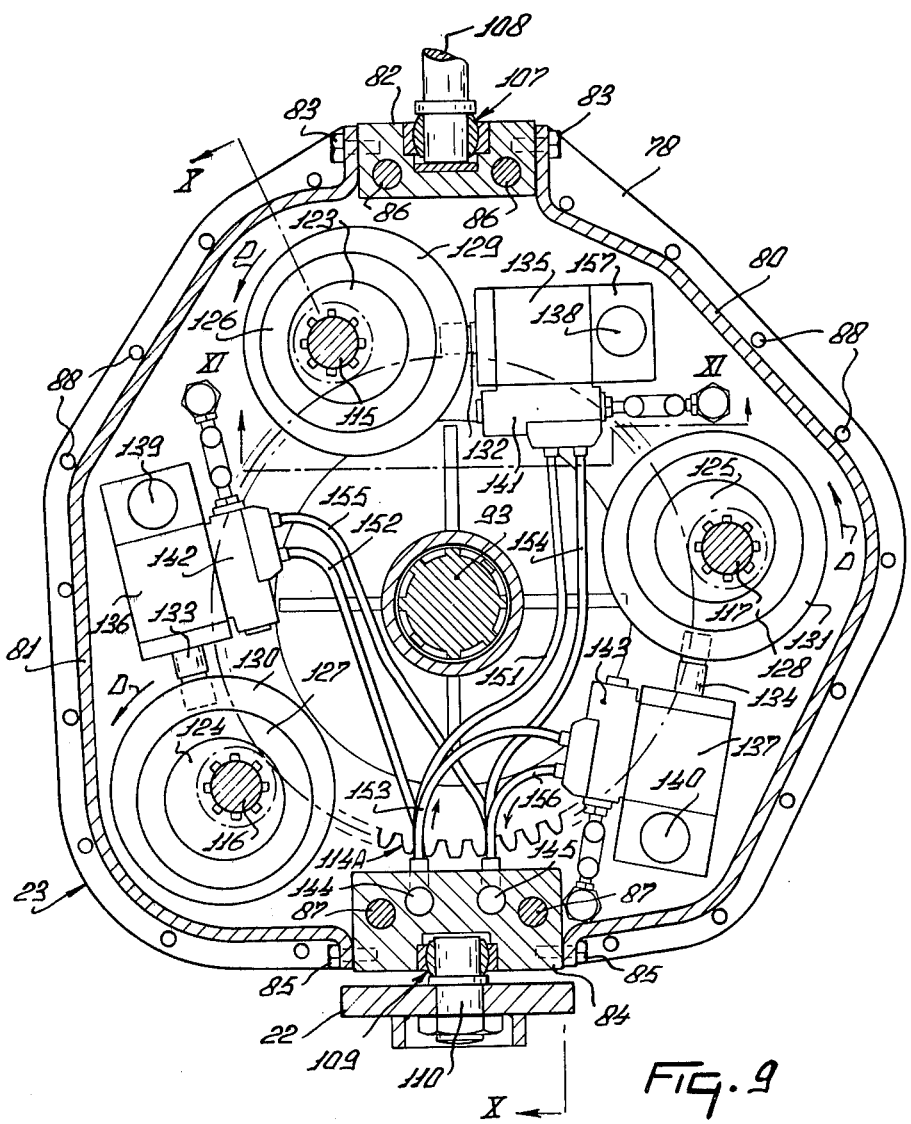
FIG. 9 is a section taken on the line IX—IX in FIG. 10 and shows one of the driving mechanisms.

The wheel motor 23 that is illustrated in FIGS. 9 to 12 of the drawings has a housing which comprises an inner side plate 78 and a parallel outer side plate 79, the outer circumferential shapes of those two plates being visible in FIG. 9 of the drawing. Two wall members in the form of wall strips 80 and 81 are clamped between the side plates 78 and 79, each of the two wall strips 80 and 81 being afforded by an elongate oblong steel strip that is bent into the required shape shown in FIG. 9. Each of the two strips 80 and 81 is formed with curved bends at several places and the imaginary axes of curvature of those bends extend perpendicular to planes which contain the longer edges of the two bent strips. Upper and lower ends of the two wall strips 80 and 81 are bent to form substantially vertical flanges which, when the two strips are assembled as illustrated in FIG. 9 of the drawings, are disposed so that both the two upper flanges face each other in spaced apart, but registering and parallel, relationship. The same is true of the two smaller lower flanges. The upper flanges of the two strips 80 and 81 have a block 82 clamped between them by bolts 83 and, similarly, the two lower flanges have a block 84 clamped between them by bolts 85. The shanks of the bolts 83 and 85 extend into screw-threaded blind holes in the material of the blocks 82 and 84. The block 84 affords a member by way of which fluid pressure energy is supplied to the motor 23.

Both the wall strips 80 and 81 and the blocks 82 and 84 are clamped to the side plates 78 and 79 by bolts 86 and 87 that extend through screw-threaded holes in the blocks 82 and 84. Further bolts 88 are arranged around the edges of the two side plates 78 and 79 at substantially regular intervals to clamp those side plates against the edges of the wall strips 80 and 81 and against side faces of the blocks 82 and 84. The wall strips 80 and 81 are maintained in their appointed positions by the bolts 83 and 85 and by the clamping effect of the bolts 88 and their longer edges are not otherwise fastened to the side plates 78 and 79.

The two substantially identical inner and outer side plates 78 and 79 have aligned central openings which are provided with bearing holders 89 and 90 respectively, said bearing holders 89 and 90 being bolted to the side plates 78 and 79. The bearing holder 89 affords a closed cover and receives a bearing 91 in the manner which can be seen in FIG. 10 of the drawings. The other bearing holder 90 is not of closed construction but receives an aligned bearing 92, an output or driving shaft 93 having one end journalled in the bearing 91 and a central region journalled in the bearing 92, the opposite end of the shaft 93 projecting outwardly beyond the bearing housing 90. The length of the shaft 93 that projects beyond the bearing housing 90 is substantially equal to the length thereof that is disposed inside the housing of the wheel motor 23, the output or driving shaft 93 being splined throughout most of its length and the outwardly projecting portion thereof being surrounded by a sleeve 94 whose internal surface is formed with splines that cooperate with those on the shaft 93. The end of the sleeve 94 that is remote from the bearing housing 90 is closed by a shouldered cover 95 of circular configuration that is retained in its appointed position by a number of peripherally positioned small bolts. The cover 95 is also formed with a central hole and a larger retaining bolt 96 is entered through the central hole in the cover 95 and into a screwthreaded blind bore 97 formed axially in the output or driving shaft 93. The retaining bolt 96 fixes the sleeve 94 in its appointed axial setting with respect to the projecting portion of the output or driving shaft 93. Approximately midway along its length, the sleeve 94 has an annular flange 98 welded to it in perpendicular relationship with the longitudinal axis of the sleeve and with the geometric center of said flange coincident with that axis. The weld lines which secure the flange 98 to the sleeve 94 are formed on both sides of the flange 98 and both extend throughout 360° around the longitudinal axis of the sleeve 94. An annular brake disc 99 is firmly but releasably secured to the flange 98 by a number of bolts 100 so that the general plane of the brake disc 99 is perpendicular to the axis of the sleeve 94. The geometric center of the brake disc 99 coincides with the longitudinal axis of the sleeve 94 and an outer circumferential region of said disc that is of limited angular extent is embraced by a brake block 101 that is rigidly secured to the housing of the wheel motor 23. The brake block 101 is provided with opposed brake pads 102 that are spaced apart from one another with the disc 99 between them but just clear of contact therewith (see FIG. 10).

A second annular flange 103 is welded to the external surface of the sleeve 94 close to the end of that sleeve that is provided with the cover 95, said second flange 103 being in parallel relationship with the flange 98. Once again, the geometric center of the flange 103 coincides with the longitudinal axis of the sleeve 94 and said flange 103 is welded to the sleeve 94 along two weld lines that lie at opposite sides of the flange and that both extend throughout 360° around said axis. The pressed steel body 104 of the associated front ground wheel 5 is secured to the periphery of the second flange 103 by a plurality of bolts 105, the wheel body 104 carrying a rim upon which the pneumatic tyre of the wheel is mounted in a more or less conventional manner. It will be remembered that all four of the front wheels 5 and rear wheels 7 are of identical interchangeable construction but that, while the central wheels 6 may be the same as the front and rear wheels 5 and 7, those wheels are replaced, for a number of purposes, by alternative wheels of one of the kinds that have been described with reference to FIGS. 5 and 6 of the drawings, the mounting of such alternative wheels on the output shafts 58 of the wheel motors 24 being accomplished in the manner that has been described with reference to FIGS. 7 and 8 of the drawings. The sleeve 94 rotates relative to the bearing housing 90 during travel of the tractor and, accordingly, a bearing steel 106 which is shown only diagrammatically in FIG. 10 of the drawings is provided between the housing 90 and the sleeve 94 close to the bearing 92. It is only necessary to remove the brake block 101 from its rigid, but releasable, connection to the housing of the wheel motor 23 to enable the sleeve 94 and brake disc 99 to be withdrawn from the shaft 93, after unscrewing the retaining bolt 96, rather then merely removing the wheel 5 from the second flange 103 by undoing the bolts 105.

The upper block 82 that is illustrated in FIG. 9 of the drawings is provided with a pivot bearing 107 in which an upper king pin 108 is lodged. The longitudinal axis of the upper king pin 108 perpendicularly intersects the longitudinal axis of the output or driving shaft 93 of the wheel motor and is coincident with the longitudinal axis of a lower king pin 110 that forms part of a corresponding lower pivot bearing 109. It can be seen in FIGS. 2 and 3 of the drawings that the upper king pins 108 are secured to the projecting ends of the upper support 21 and, similarly, the lower king pins 110 are secured to the projecting ends of the lower support 22. The pivotal mounting for all four of the front and rear wheel motors 23 and 25 is the same, the upper and lower king pins 108 (FIG. 2) and 110 that correspond to the rear wheel motors 25 being secured to the projecting end portions of the upper support 27 and co-operating lower support, respectively, those supports being carried by the rockably mounted rear structure 26.

It can be seen from FIGS. 1 to 3 of the drawings that the two front wheel motors 23 and the two rear wheel motors 25 are provided with respectively rearwardly and forwardly inclined steering arms 113 and 114, the free ends of the two steering arms 113 being pivotally interconnected by a substantially horizontal track rod 111 and the free ends of the two steering arms 114 being similarly pivotably interconnected by a substantially horizontal track rod 112. The two track rods 111 and 112 extend substantially perpendicular to the direction A. A steering mechanism that may be of a construction which is known per se, and which is accordingly not illustrated in the accompanying drawings, extends between the steering wheel 17 and said track rod/steering arm assemblies 111/113 and 112/114 respectively so that turning the steering wheel 107 will cause the track rods 111 and 112 both to be displaced in the same direction that is substantially parallel to their own lengths thus causing the front and rear ground wheels 5 and 7 to be turned angularly in opposite directions about the axes that are defined by the upper and lower king pins 108 and 110, the tractor then being able to negotiate a bend in the direction dictated by the movement of the steering wheel 7 by the driver. Clearly, the steering mechanism is arranged so that the angular steering displacement of the front and rear ground wheels 5 and 7 are the same with the result that, when the tractor is negotiating a bend on a flat surface, the two axes of rotation of the front wheels 5, the two axes of rotation of the rear wheels 7 and the common axis of rotation of the non-steerable central wheels 6 will all intersect at a single point. The housings of the central wheel motors 24 include the blocks 82 and 84 but, naturally, omit the upper and lower pivot bearings 107 and 109 and the king pins 108 and 110 because the central ground wheels 6 are not steerable but are positively upwardly and downwardly displaceable relative to the frame beams 1 with the aid of the assemblies that have been described with particular reference to FIG. 4 of the drawings.

The portion of the output of driving shaft 93 (FIG. 10) that is disposed between the opposite inner and outer side plates of the housing of the wheel motor 23 carries a central toothed pinion 114A, the hub of said pinion 114A being internally splined for co-operation with the matching splines of the shaft 93. The pinion 114A has straight or spur teeth and its effective diameter or pitch circle (that circle being indicated by a broken line in FIG. 9 of the drawings) has a magnitude which is substantially 60% of the greatest magnitude of the housing of the wheel motor 23 as seen in FIG. 9 of the drawings. In addition to the output or driving shaft 93, three splined shafts 115, 116 and 117 are provided in the housing, all of them extending parallel to the shaft 93 and thus perpendicular to the inner and outer side plates 78 and 79 of said housing. As seen in the sectional view of FIG. 9 of the drawings, the three shafts 115, 116 and 117 are located just outside the pitch circle of the central toothed pinion 114A. The opposite ends of the three shafts 115, 116 and 117 are rotatably journalled in bearings 118 and 119 carried by bearing housings 120 and 121 respectively, the bearing housings being releasably bolted to the side plates 78 and 79 respectively. Each of the three shafts 115 to 117 carries a corresponding straight-or spur-toothed first pinion 122 and a corresponding one of three circular eccentrics 123, 124 and 125, the cylindrical interior of each first pinion 122 and of each of the three eccentrics 123 to 125 being splined to match, and co-operate with, the splines on the corresponding shaft 115, 116 or 117. The three eccentrics 123, 124 and 125 are surrounded by the inner races of corresponding ball bearings 126, 127 and 128. The outer races of the three ball bearings 126, 127 and 128 are surrounded by the inner cylindrical walls of three corresponding driving rings 129, 130 and 131 respectively, said driving rings being freely rotatable around the corresponding eccentrics because of the intervening ball bearings. Each of the three rings 129, 130 and 131 is formed with a corresponding screw-threaded bore which opens into the outer curved surface of the ring concerned and into which is screwed the matchingly threaded end of a corresponding one of three piston rods 132, 133 and 134. The piston rods 132 to 134 are thus firmly secured to the rings 129 to 131, it being noted from FIGS. 9 and 12 of the drawing that, in order to minimize the overall sizes of the rings, they, too, are of eccentric formation.

The eccentricity of the rings 129 to 131 is produced by spacing the parallel axes of curvature of their internal and external surfaces from one another and it will be evident from the drawings that the screw-threaded bores which co-operate with the matchingly screw-threaded ends of the piston rods 132 to 134 are formed in the rings at the locations at which those rings are radially thickest. The rings are, of course, radially thinnest at locations diametrically opposite to the connections to the piston rods 132 to 134 respectively and it will be noted that, during operation, the rings 129 to 131 only perform quite small oscillatory movements relative to the wheel motor housing so that the "thin" regions of those rings always occupy approximately, although not exactly, the same positions with respect to that housing.

The piston rods 132, 133 and 134 form parts of three corresponding double-acting hydraulic piston and cylinder assemblies which also include corresponding cylinders 135, 136 and 137. These piston and cylinder assemblies afford driving means and the base ends of their three cylinders 135, 136 and 137 are turnably mounted on corresponding pivots 138, 139 and 140, said pivots being perpendicularly secured to the two side plates 78 and 79 so that the axes which they embody are all parallel to the longitudinal axis of the output or driving shaft 93. Each of the three cylinders 135, 136 and 137 has a corresponding control member in the form of a control valve 141, 142 or 143 fixedly secured to its side. It will be noted from FIG. 9 of the drawings that, as seen in that Figure, the three piston rods 132, 133 and 134 all extend substantially tangentially with respect to the aforementioned pitch circle of the central toothed pinion 114A.

The lower block 84 is formed with two fluid-conducting bores 144 and 145, the longitudinal axes of said bores both being sustantially parallel to the longitudinal axis of the output or driving shaft 93. The bores 144 and 145 open onto the side face of the block 84 which abuts against the side plate 78 and are there connected to the ends of flexible hydraulic ducts 146 and 147 (FIG. 10) which lead indirectly to the hydraulic pump 10 by way of the controls within the cabin 15. The duct 146 is an oil or other hydraulic pressure medium supply duct and the duct 147 is an oil or other hydraulic pressure medium return duct. Each of the two bores 144 and 145 has three branches 148, 149 and 150 (FIG. 10), said six branch bores opening onto the upper surface of the block 84 which faces the output or driving shaft 93. The three branch bores 148 to 150 that correspond to the supply bore 144 are connected to the ends of three flexible ducts 151, 152 and 153 that lead to hydraulic pressure medium inlets on the three control valves 141, 142 and 143 respectively. Those inlets are located closer to the corresponding rings 129, 130 and 131 than are outlets of the same valves which communicate, by way of three corresponding flexible ducts 154, 155 and 156, with the branch bores 148, 149 and 150 of the return bore 145 in the block 84.

The three driving means that are afforded by the three piston and cylinder assemblies 132 to 137 inclusive all have the same construction and it is, accordingly, only necessary to describe one of them in detail. Accordingly, the single assembly 132/135 will now be explained in greater detail with particular reference to FIGS. 11 and 12 of the drawings. The cylinder 135 that is illustrated in those Figures is secured at one of its ends to a bearing block 157 which is formed from solid steel and which, as can be seen in the drawings, is basically of an elongated cuboid configuration. The opposite ends of the bearing block 157 take the form of milled pins or studs 158, the longitudinal axes of which are coincident, that embody the pivot 138 shown diagrammatically in FIG. 9. The two pins or studs 158 are surrounded by bronze bushings 159 with external surfaces of spherically curved configuration for co-operation with matchingly curved bearing members carried in holders 160 and 161 bolted to the side plates 78 and 79 respectively. The choice of this type of solid cushion bearing is made because the bearings have to withstand heavy forces during operation without the pins or studs 158 moving relative to them to any significant extent. A cavity 162 (FIG. 12) in the bearing block 157 supportingly receives a projecting portion of a plain bronze bearing 163 and the end of the cylinder 135 which is remote from the ring 129 fits intimately against the surface of the block 157 that surrounds the mouth of its cavity 162. The cylinder 135 is clamped tightly against the bearing block 157 by bolts 164, that extend parallel to the longitudinal axis of the cylinder 135, with screwthreaded shanks entered into matchingly screwthreaded blind bores formed in the block 157. A second plain bronze bearing 165 is supported at the end of the cylinder 135 remote from the block 157, the two bearings 163 and 165 defining sliding surfaces that are in axial alignment, the piston rod 132 being slidably mounted in those cylindrical surfaces. The end of the piston rod 132 that is remote from the ring 129 protrudes, with clearance, into a bore formed in the bearing block 157. The piston rod 132 carries a piston 166 which is located inside the cylinder 135 between the two bronze bearings 163 and 165, the piston 166 being a close slidable fit against the wall of the cylinder 135. Two bores 167 and 168 are formed through the body of the control valve 141 and said bores 167 and 168 open into the cylinder 135 at locations which adjoin the bronze bearing 165 and the bronze bearing 163 respectively. It will be evident from FIG. 12 of the drawings that the internal faces of the two bronze bearings 163 and 165 define the opposite ends of the internal chamber of the cylinder 135.

The body of the control valve 141 is formed with an internal bore 169 that extends axially parallel to the cylinder 135 to which the valve 141 is secured. The internal bore 169 comprises five cylindrical chambers 170, 171, 171A, 172 and 172A that are all of enlarged diameter as compared with the diameter of the bore 169 itself, said five chambers being formed by milling the body of the valve 141 and being located at regularly spaced apart intervals axially along the bore 169. The chambers 171A and 172A communicate with lateral bores 173 and 174 respectively and those bores are coupled to the ends of the flexible ducts 151 and 154 that are remote from the block 84 (see also FIG. 9). Lateral bores 175 and 176 (FIG. 11) open into the chambers 170 and 172A respectively and are interconnected by a bore 177 that is perpendicular to the bores 175 and 176 but parallel to the main internal bore 169 of the valve 141. The chambers 170 and 172A are thus in open communication with one another by way of the bores 175, 176 and 177. A slidable valve spool 178 is located in the internal bore 169 of the valve 141 and comprises four shoulders 179, 180, 181 and 182 that have the same external diameter as the internal diameter of the bore 169 itself but, consequently, significantly smaller external diameters than the internal diameters of the five chambers 170, 171, 171A, 172 and 172A. The four shoulders 179 to 182 are carried by a rod-shaped body 183 of the valve spool 178, said body having a diameter which is significantly less than the diameter of the internal bore 169 of the valve 141. As will be evident from FIG. 12 of the drawings, the rod-shaped body 183 of the valve spool 178 extends right through the axial bore 169 in the body or housing of the valve 141 and it will be noted that the shoulders 179 and 182 always close the opposite and otherwise open ends of the bore 169 whatever possible axial position is adopted by the valve spool 178 which thus projects to a greater or lesser extent from both ends of the bore 169.

Figure 11:
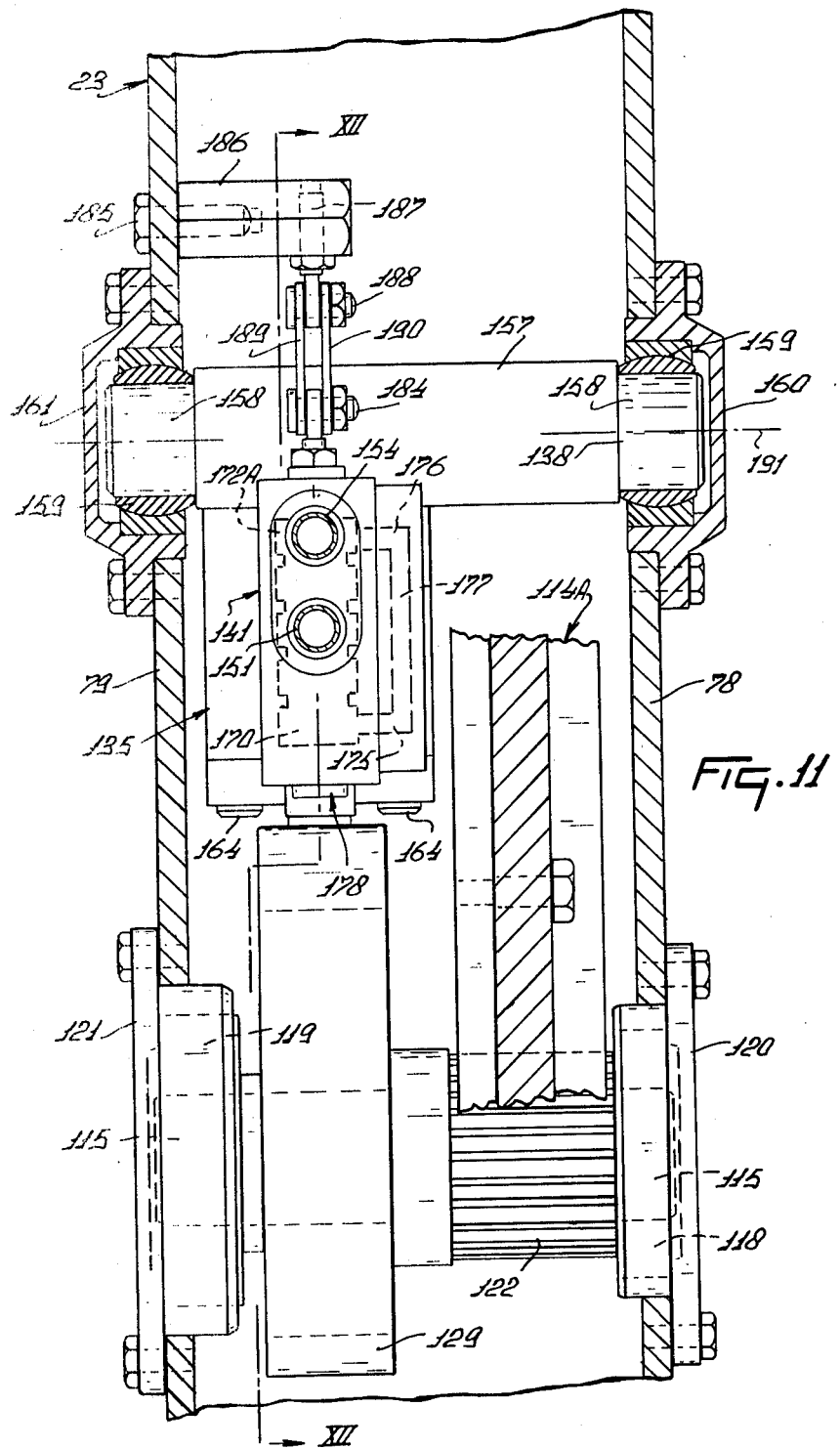
FIG. 11 is a section, to an enlarged scale, taken on the line XI—XI in FIG. 9.

FIG. 12 of the drawings illustrates an axially central position of the valve spool 178 in the bore 169 and, in that position, the inner end of the shoulder 179 is substantially coplanar with the outer end of the chamber 170 and the inner end of the shoulder 182 is substantially coplanar with the outer end of the chamber 172A. The shoulders 180 and 181 are of the same axial lengths as the chambers 171 and 172 respectively and, in the position illustrated in FIG. 12 of the drawings, those shoulders 180 and 181 exactly fit between the opposite axial ends of the two chambers 171 and 172 respectively. The end of the valve spool 178 that is adjacent to the shoulder 182, and that projects outwardly beyond the corresponding end of the bore 169, is provided with an eye which receives a pivot bolt 184 that turnably connects the ends of two parallel links 189 and 190 to said eye. The longitudinal axis of the bolt 184 is perpendicular to the longitudinal axis of the valve spool 178 but parallel to the axis 191 of the pivot 138 (FIGS. 9 and 11), that axis being embodied in the pins or studs 158 (FIG. 11). The eye is carries by a short screw-threaded rod which can be screwed further into, or further out of, a matchingly screw-threaded axial blind bore in the projecting end of the shoulder 182 to increase or decrease the distance between the axis defined by the pivot bolt 184 and the valve spool 178 as may be required, said short screw-threaded rod being provided with a lock nut to ensure maintenance of any selected position of adjustment.

A bolt 185, whose longitudinal axis of which is perpendicular to the outer side plate 79, secures an anchorage 186 to the internal surface of said plate 79 in perpendicular relationship with that surface. The anchorage 186 is formed, towards the end thereof that is remote from the plate 79, with a transverse screw-threaded bore having a longitudinal axis in approximate alignment with the longitudinal axis of the internal bore 169 of the valve 141. A matchingly screw-threaded rod 187 is entered into the screw-threaded transverse bore in the anchorage 186 and carries, at its projecting end, an eye which is connected by a second pivot bolt 188 to the ends of the two links 189 and 190 that are remote from the pivot bolt 184. The axes defined by the two pivot bolts 184 and 188 are parallel to one another. The rod 187 which carries the eye that surrounds the pivot bolt 188 can be screwed further into, or further out of, the transverse bore in the anchorage 186 to alter the distance of the eye from that anchorage, a lock nut being provided on the rod 187 to maintain any chosen position of adjustment of the eye relative to the anchorage 186. The longitudinal axis of the valve spool 178 is spaced from a plane which contains the axis 191 that is defined by the pins or studs 158 and that also contains the longitudinal axis of the shaft 115. The spacing between said axis and said plane is substantially equal to the internal diameter of the cylinder 135.

The tractor that has been described may have four pneumatically tired wheels in contact with the ground, that is to say, the front and rear ground wheels 5 and 7 so that, at each side of the tractor, there will be two ground wheels that are in line with each other in the intended direction of straight forward travel of the tractor. Under these conditions, the central ground wheels 6 are maintained clear of contact with the ground surface by appropriate adjustments of the assemblies that have been described with particular reference to FIG. 4 of the drawings. Alternatively, the central ground wheels 6 may be lowered into contact with the ground surface so that the tractor may then operate with six ground wheels of which there will be three ground wheels in line with each other in the intended direction of straight forward travel of the tractor at both sides of the frame of that tractor. Because each of the six ground wheels 5 to 7 inclusive has its own wheel motor 23, 24 or 25, the controls in the cabin 15 can readily be arranged so that any chosen pair of ground wheels 5, 6 or 7 may be driven alone or so that any chosen two of the three pairs may be driven or so that all three pairs may be driven simultaneously. Thus, only the front wheels 5 or only the central wheels 6 or only the rear wheels 7 may be driven or the front and central wheels 5 and 6 or the central and rear wheels 6 and 7 or the front and rear wheels 5 and 7 may be driven or all six of the wheels 5, 6 and 7 may be driven.

Since each ground wheel 5, 6 and 7 has its own wheel motor 23, 24 or 25 which is powered hydraulically from the pump 10, and since two, four or all six of those wheel motors can be operated in accordance with the settings of the controls of the tractor, the speed of travel of the tractor over the ground when all six of its wheels 5, 6 and 7 are driven, is determined by the output capacity of the hydraulic pump 10. When the driver's controls are set to operate only one pair of the ground wheels, the full hydraulic displacement capacity of the pump 10 is available for that pair alone so that the tractor can then attain its maximum speed of travel which it is preferred should be substantially 30 kilometers or 19 miles per hour. If the driver sets his controls to operate two of the three pairs of ground wheels, then the maximum attainable speed of travel of the tractor will be correspondingly lower and preferably has a value of substantially 15 kilometers or 9½ miles per hour. When all six of the ground wheels 5, 6 and 7 are in contact with the ground and are driven, the maximum attainable speed of the tractor will be lower still and preferably has a value of substantially 10 kilometers or 6⅓ miles per hour. When travel at a relatively high speed towing no load at all or only a light load on a flat road is desired, the tractor will travel entirely satisfactorily with only one pair of its ground wheels in operation. When a slower speed of travel is appropriate, possibly across uneven land and/or towing a moderately heavy load, two pairs of the ground wheels may advantageously be driven which will usually be the front and rear wheels 5 and 7 but which could, alternatively, be a pair which includes the central ground wheel 6 as discussed above. Finally, if the tractor is to travel at a relatively slow speed while producing a high tractive effort under conditions in which a firm grip of the wheels upon the soil is desirable, then the controls should be set to drive all six of the ground wheels 5, 6 and 7. An example of the last mode of operation of the tractor is in its use in plowing.

When the soil that is to be traversed by the tractor is in an unstable condition, for example when it is very muddy after a long spell of rain, there will be a tendency for wheel skidding to take place if a high tractive effort is exerted by the tractor. Under such conditions, the central ground wheels 6 that have been described with reference to FIG. 5 or to FIG. 6 of the drawings may be used. A pair of such wheels is substituted for the normally employed pneumatically tired wheels using the mounting construction and arrangement that has been described with particular reference to FIGS. 7 and 8 of the drawings. If necessary, the central wheels 6 may be pressed firmly downwards into contact with the ground surface to bring them into a setting 6' which is shown in broken lines at the foot of FIG. 1 of the drawings by actuating the double-acting hydraulic piston and cylinder assemblies 38/40 to withdraw the pistons 40 more or less fully into the cylinders 38. The extent of withdrawal is, of course, controllable by the driver from the cabin 15. When the pistons 40 are withdrawn inwardly into the cylinders 38 in this way, the arms 42, the supporting tube 36, the lugs 37, the wheel motors 24 and the wheels 6 themselves are all positively urged downwardly towards the ground surface in a direction opposite to the direction that is indicated by the arrow B in FIG. 4 of the drawings.

If central ground wheels 6 of the "cage" type that have been described with reference to FIG. 5 of the drawings are employed, the outer curved surfaces of the inner, outer and central fellies 47, 48 and 50 will bear against the unstable soil and, at any given instant, several of the treads 49 will be pressed into that soil and the rearward sides of those treads with respect to the direction A will bear drivingly against the soil so that the driving torque per unit area of contact between the treads 49 concerned and the soil will be quite low. This driving torque is exerted in directions which are substantially tangential to circles centered upon the axes of rotation of the ground wheels 6 and, if required, the number of fellies per wheel may be increased to produce a consequent reduction in the pressure per unit area of contact with the ground surface which is exerted in radial directions relative to the axes of rotation of the two wheels, those axes of rotation normally being substantially coincident. If central wheels 6 in accordance with the embodiment of FIG. 6 of the drawings are employed, an extensive area of contact of those wheels with an unstable ground surface takes place where the broad outer curved surfaces of the fellies 54, 55 and 56 bear against the soil and inevitably sink into it to some extent. However, gaps are left between the fellies 54, 55 and 56 through which water, mud and the like can escape from the areas of direct contact between the fellies and supporting layers of the soil. The teeth 57 penetrate into the soil and tend to ensure that the driving torque does not produce an excessively high pressure per area of contact between the tooth surfaces and the soil in directions that extend substantially tangentially with respect to the fellies 54, 55 and 56. This is because several of the teeth 57 will be effective at any given time and each tooth has a relatively large surface area at the rear thereof with respect to the direction A. If rings are employed instead of the teeth 57 as extensions of the fellies 54, 55 and 56, a very effective tractive grip of the wheels upon the ground is also produced. It is noted again that, in the case of the wheel embodiment of FIG. 5 of the drawings, that wheel has a large width (axial length) which is preferably twice that of a conventional pneumatically tired tractor wheel such as is used for the front wheels 5 and rear wheels 7. As the wheels have large diameters which are preferably not less than 150 centimeters, several of the long (in an axial direction) treads 49 will be pressed into muddy or other unstable soil at any one time. This will readily be appreciated by considering FIG. 1 of the drawings with the illustrated central wheel 6 (which corresponds to FIG. 5 of the drawings) positively displaced downwardly to the setting 6'.

Figure 4:
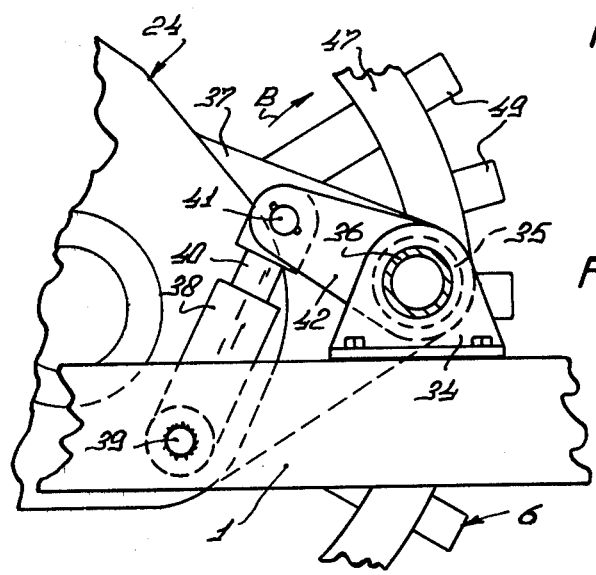
FIG. 4 is a section, to an enlarged scale, taken on the line IV—IV in FIG. 2.

When central wheels 6 of one of the kinds that are illustrated in FIGS. 5 and 6 of the drawings are fitted to the tractor and it is to travel over relatively firm and stable soil without an excessive load, or along a paved road, it is not necessary for the central wheels 6 to be used and, in some cases, it is positively desirable that they should not be used because of the likelihood of damage by the treads 49, teeth 57 or other extensions to, for example, an asphalt road surface. Under these circumstances, the pistons 40 of the hydraulic piston and cylinder assemblies 38/40 are extended to displace the wheels 6 bodily upwards in the direction B (FIG. 4).

This brings the wheels to an inoperative setting 6" which is shown in broken lines in FIG. 1 of the drawings and in which setting the peripheries of the wheels are clear of contact with the ground. The central wheel motors 24 are not operated so that the wheels 6 do not rotate and the tractor can proceed with only the front wheels 5 or only the rear wheels 7 or with both the front wheels 5 and the rear wheels 7 being driven by the corresponding wheel motors. The hydraulic piston and cylinder assemblies 38/40 can, it will be remembered, be adjusted to any chosen settings that are between those which produce the wheel settings 6' and 6" that are shown in FIG. 1 of the drawings such, for example, as the setting of the wheels 6 that is shown in full lines in FIG. 1.

The rear structure 26 which carries the rear wheel motors 25 and the rear ground wheels 7 is rockable about the fore and aft axis that is afforded by the tubular support 28 and the bearing 29 to ensure that, even when travelling across very uneven ground, the rear wheels 7 will remain constantly in contact with that ground thus eliminating or minimizing any skidding which might take place if said rear ground wheels 7 were not freely rockable about a fore and aft axis extending substantially parallel to the direction A at a location midway between those ground wheels. When the two front wheels 5 are in contact with the ground, the two rear wheels 7 will also automatically be in contact with the ground except under exceptionally adverse conditions. Both the front wheels 5 and the rear wheels 7 are steerable about the substantially vertical (when the tractor is standing on horizontal ground) axes that are afforded by the corresponding aligned pairs of king pins 108 and 110. Loads, tools or implements that are to be carried, towed or pushed can be fastened in a known manner to the substantially conventional front and rear three-point lifting devices or hitches 30 and 31. Any tools or implements that need to be power driven from the tractor have their rotary input shafts connected to either the front power take-off shaft 32 or the rear power take-off shaft 33 through the intermediary of a telescopic transmission shaft of a construction that is known per se which has universal joints at its opposite ends and which is not illustrated in the accompanying drawings.

In addition to having substantially identical constructions, the six wheel motors 23, 24 and 25 all operate in the same way and it is therefore only necessary to describe the operation of one of the front wheel motors 23 with particular reference to FIG. 9 to 12 of the drawings. The teeth of all three of the pinions 122 are in mesh with the teeth of the central pinion 114A which latter is rigid with the output or driving shaft 93 and thus with the associated front ground wheel 5. The three pinions 122 are rigid with the corresponding shafts 115, 116 and 117 and the three eccentrics 123, 124 and 125 are also rigid with the same shafts. Thus, when the eccentrics 123, 124 and 125 rotate, the central pinion 114A is also caused to rotate carrying with it the output or driving shaft 93 and the front ground wheel 5. Each of the three eccentrics 123 to 125 is driven by the corresponding double-acting piston and cylinder assemblies which include the three pistons 135, 136 and 137 respectively. Oil or other hydraulic pressure medium is supplied indirectly from the output side of the pump 10 to the three hydraulic piston and cylinder assemblies by way of the flexible ducts 151, 152 and 153, the inlet or supply bore 144 and the flexible duct 146. The oil or other hydraulic pressure medium returns to a reservoir of the pump 10 by way of the ducts 154, 155 and 156, the return bore 145 and the flexible duct 147. It is noted that, in the embodiment which is being described, each wheel motor has three piston and cylinder assemblies which co-operate with corresponding eccentrics but that this is not essential and that the number thereof may be increased to more than three.

At any given instant during operation, the relative positions of the three piston and cylinder assemblies and the three corresponding eccentrics will be different. In the case of the wheel motor 23 that is illustrated in FIGS. 9 to 12 of the drawings, a phase difference of 120° is involved. When, considered from one of the pivots 138, 139 or 140 that are diagrammatically illustrated in FIG. 9, the corresponding piston rod and eccentric are at "top dead center" or "bottom dead center" (i.e. with the piston rod concerned fully extended from its cylinder with the region of minimum radial thickness of the corresponding eccentric in line therewith, or vice versa), neither of the other two assemblies will be in either a "top dead center" or "bottom dead center" condition. In FIG. 9 of the drawings, the uppermost piston and cylinder assembly 132/135 is in substantially a "bottom dead center" condition. Due to the supply of oil or other hydraulic medium under pressure, the piston rods 132, 133 and 134 are repeatedly caused to move inwardly and outwardly under the control of the associated valves 141, 142 and 143. During outward movements of the piston rods from their cylinders 135, 136 and 137, the rings 129, 130 and 131 roll around the corresponding eccentrics 123, 124 and 125 and cause those eccentrics to exert torques on the respective shafts 115, 116 and 117. Those shafts are thus rotated and that rotation is transmitted to the central pinion 114A by the pinions 122. Since the piston and cylinder assemblies are double-acting assemblies, each assembly also exerts a torque on the corresponding shaft 115, 116 or 117 during withdrawal, under hydraulic power, into its cylinder.

It can be seen from FIGS. 11 and 12 of the drawings that the piston and cylinder assembly which includes the cylinder 135 rocks about the corresponding axis 191 during each cycle of operation (one complete reciprocation of the piston 166 and its rod 132 in the cylinder 135). However, the amplitude of the oscillation of the piston and cylinder assembly about the axis 191 is quite small so that said assembly moves to a maximum extent of only a few degrees to either side of a plane which contains the axis 191 and the longitudinal axis of the corresponding shaft 115. It is, however, this rocking movement of the piston and cylinder assembly about the axis 191 that operates the valve 141, the body or housing of which is rigidly connected to the cylinder 135. It will be remembered that the valve spool 178 of the valve 141 has one of its ends pivotably linked by the parts 184, 187, 188, 189 and 190 to the anchorage 186 that is fixed in position relative to the outer side plate 79 of the housing of the wheel motor. Thus, during oscillation of the piston and cylinder assembly about the axis 191, the valve spool 178 will slidably reciprocate in the internal bore 169 of the valve 141. The construction and arrangement is, of course, such as to ensure that the pressure and return connections for oil or other hydraulic pressure medium to the chamber of the cylinder 135 at opposite sides of its piston 166 produce the required repetitive reciprocation of the piston 166 and its rod 132 in the cylinder 135. FIG. 12 of the drawings illustrates the piston and cylinder assembly which includes the cylinder 135 and the corresponding eccentric 123 in a "bottom dead center" condition. As the shaft 115 turns in the direction indicated by an arrow D due to the operation of the other two piston and cylinder assemblies of the same wheel motor and also to the inertia of the moving parts, the cylinder 135 will be angularly displaced about the axis 191 in a clockwise direction as seen in FIG. 12. The valve spool 178 will thus be displaced in the internal bore 169 of the valve 141 in the direction indicated by an arrow E in FIG. 12 and the shoulder 181 will move to open communication between the chambers 171A and 172 thus placing the bore 168 in open communication with the flexible supply duct 151. The end of the cylinder chamber that lies between the piston 166 and the face of the bronze bearing 163 thus receives oil or other hydraulic medium under pressure and the piston 166 is urged to move towards the bearing 165. This movement causes the ring 129 to exert a torque on the eccentric 123 and shaft 115 through the intermediary of the ball bearing 126 which torque causes continued rotation of the shaft 115 in the direction D. The intermeshing pinion 114A is thus caused to rotate in a direction opposite to the direction D carrying with it the shaft 93 and the front ground wheel 5. Displacement of the valve spool 178 in the direction E from the position shown in FIG. 12 of the drawings also moves the shoulder 180 in that direction thus bringing the bore 167 into communication with the chamber 170. The chamber 170 is in communication with the flexible return duct 154 by way of the lateral bores 175 and 176, the interconnecting bore 177 and the chamber 172A so that oil or other hydraulic medium between the piston 166 and the plain bearing 165 can return to the reservoir of the pump 10 without significant resistance.

When the shaft 115 has rotated through 180° as compared with the position shown in FIG. 12 of the drawings, the cylinder 135 will have rocked back around the axis 191 to the same angular setting about that axis as it possesses as illustrated in FIG. 12 and the spool 178 will have been moved axially back through the bore 169 in a direction opposite to the direction E to the same position as is illustrated in FIG. 12. The piston 166 will, however, be very close to the plain bearing 165, instead of to the plain bearing 163, under these conditions. Further angular displacement of the shaft 115 in the direction D causes the cylinder 135 to move about the axis 191 in a direction which causes the valve spool 178 to be displaced further in the bore 169 in a direction opposite to the direction E. The shoulder 180 thus opens communication between the bore 167 and the chamber 171A, via the chamber 171, and this places the end of the cylinder chamber between the plain bearing 165 and the piston 166 in open connection with the supply duct 151. At the same time, the shoulder 181 moves to a position in which the bore 168 is in communication with the return duct 154 by way of the chambers 172 and 172A so that oil or other hydraulic medium can return from between the piston 166 and the plain bearing 163 to the reservoir of the pump 10 without significant resistance. The bores 175 to 177 are ineffective at this time because the chamber 170 is closed off from communication with the chamber 171 by the displaced shoulder 180. Substantially the full output pressure of th pump 10 is always exerted on the piston 166 except when the assembly is in the "bottom dead center" condition illustrated in FIG. 12 of the drawings or when the shaft 115 has turned through 180° relative to what is illustrated in FIG. 12 to produce a "top dead center" condition. At these instants, the other two hydraulic piston and cylinder assemblies of the same wheel motor continue, indirectly, to rotate the shaft 115 in the direction D and this effect is assisted by the inertia of all the moving parts which, naturally, comprise every part of the tractor when that tractor is in motion over the ground. The tractor which has been described comprises eighteen piston and cylinder assemblies in its six wheel motors 23, 24 and 25 and all eighteen of those assemblies co-operate with the corresponding eccentrics in an identical manner to that which has been described with particular reference to FIGS. 9 to 12 of the drawings. Since the longitudinal axes of the piston rods, such as the piston rod 132, are perpendicular to the axes of rotation of the corresponding ground wheels, they are suitably disposed to exert torque substantially directly upon the shafts (such as the shaft 93) which embody the axes of rotation of the ground wheels. Each large central toothed pinion 114A transmits a relatively high torque which only varies to an insignificant extent from instant to instant. As previously mentioned, it is possible to provide each wheel motor with more than three piston and cylinder assemblies and, with such a construction, each assembly would be arranged out of phase with all of the other assemblies of the same wheel motor. The quite small fluctuations in torque which occur from instant to instant when there are three piston and cylinder assemblies per wheel motor would be still further reduced with such constructions. The volume of oil or other hydraulic pressure medium that is circulating at any instant is substantially, although not exactly, constant and, of course, the greater the number of pairs of ground wheels of the tractor that are operative during its travel, the smaller will be the variation in the quantity of oil or other medium in circulation from instant to instant because all six of the ground wheels can rotate independently without a mechanical drive coupling to their fellows so that there will be a tendency for the fluctuations attributable to different wheel motors to cancel each other. This, of course, also applies to the minor fluctuations in driving torque of the different ground wheels instant to instant.

The end of the piston rods 132 (FIG. 12) is screw-threaded and is fixedly secured in a matchingly screw-threaded bore in the corresponding ring 129 in the region of that ring which is radially thickest. Since the cylinder 135 oscillates about the axis 191, the ring 129 follows that movement and the eccentric 123 rotates inside the ring through the intermediary of the intervening ball bearing 126. The ring 129 is of eccentric construction as regards the centers of curvature of its inner and outer surfaces because it is necessary to have a greater amount of material where the piston rod 132 is secured to the ring. This is not the case at the opposite side of the ring and the eccentric construction saves material, space and weight, it being remembered that the ring 129 is one of eighteen similar rings in the tractor embodiment which is being described. When the controls within the cabin 15 are adjusted to switch off drive to one or two of the pairs of wheel motors 23, 24 and 25, the pistons 166 of the hydraulic piston and cylinder assemblies in the remaining operative wheel motors will reciprocate in their cylinders more rapidly because a greater volume of oil or other hydraulic pressure medium is available per unit time to effect that reciprocation.

The housing of each of the wheel motors 23, 24 and 25 is assembled in a particularly simple manner, the wall strips 80 and 81 being merely clamped between the two substantially identical side plates 78 and 79 by the bolts 83, 85 and 88. The construction of the housings of the wheel motors is well suited to punching and strip-bending operations by the same token the incorporation of the pinions, piston and cylinder assemblies, eccentrics and other parts can be effected in a simple, logical and readily accessible manner, those parts being first connected to one of the side plates (usually the side plate 79) which side plate already carries the loosely arranged wall strips 80 and 81 which are, at that time, only secured at their opposite ends to the blocks 82 and 84 by the bolts 83 and 85. Once the internal assembly has been completed, the missing end plate is moved into its appointed position and the wheel motor is consolidated by inserting and tightening the bolts 86, 87 and 88. This form of construction for the wheel motors produces an entirely satisfactory result without the need to use expensive metal castings.

When the steering wheel 17 of the tractor is turned to direct the tractor through a bend, the ground-contacting wheels at the radially inner side of that bend need to rotate at a slower speed than do the corresponding wheels at the radially outer side thereof. The two supply ducts (such as the ducts 146) that correspond to each pair of ground wheels are directly interconnected so that the oil or other hydraulic medium that is indirectly supplied under pressure from the pump 10 is automatically distributed to the two wheel motors concerned so that the wheel motor at the "outer" side of the bend receives proportionately more oil or other medium than does the wheel motor at the "inner" side of the bend. The wheels of each pair thus automatically adjust themselves to the correct speeds of rotation during the negotiation of a bend of any possible magnitude in either direction. The two return ducts 147 that correspond to each pair of ground wheels are also directly interconnected so that the oil or other hydraulic pressure medium can flow back to the reservoir of the pump 10 from each pair of wheel motors at different volumes per unit time during the negotiation of a bend. The cabin 15 contains a control by which the supply and return functions of the ducts 146 and 147 can be interchanged and that control can, of course, be operated to drive the tractor in a reverse direction opposite to the direction A because all of the shafts, such as the shaft 115, will be rotated in directions opposite to the direction D when the supply and return functions of the flexible ducts which are connected to the corresponding valves and hydraulic piston and cylinder assemblies are interchanged. If desired, the tractor may have more than three pairs of ground wheels in which case the or each additional pair of ground wheels will be located between the front and rear ground wheels 5 and 7 and will preferably be upwardly and downwardly displaceable relative to the tractor frame by assemblies which are similar to those that affect such displacement of the central ground wheels 6 and that have been described with particular reference to FIG. 4 of the drawings.

The tractor that has been described also forms the subject of our copending Patent application filed June 19, 1975 (Ser. No. 588,156 now abandoned) and a divisional thereof, patent application, Ser. No. 816,254, filed July 15 1977, to which reference is directed.

Although various features of the tractor and its driving mechanism that are described and/or that are illustrated in the accompanying drawings will be set forth in the following claims as inventive features, it is emphasized that the invention is not necessarily limited to those features and includes within its scope each of the parts of the tractor described, and/or illustrated in the accompanying drawings, both individually and in various combinations.

Having thus described my invention, what I claim as new and desire to secure by Letters Patent of the United States is:

1. A driving mechanism which comprises:
   a source of hydraulic fluid under pressure substantially greater than the ambient pressure;
   a rotary power output shaft;
   a plurality of hydraulic piston and cylinder assemblies, each of said assemblies in communication with said source of hydraulic fluid under pressure;
   a non-revolving housing, means mounting said assemblies on said housing whereby each said assembly is rockable relative to said housing;
   a plurality of pinions mounted in said housing, at least one corresponding pinion being rotated by reciprocation of each said piston in its respective cylinder and each said assembly caused to rock in an arc from its mounting on said housing by such reciprocating action rotating said pinion;
   a corresponding control valve means for each said assembly for governing the admission of hydraulic fluid communicated thereto from said hydraulic fluid source, each said control valve means connected in part to said housing and in part to its respective assembly whereby it is actuated by the rocking thereof relative to said housing and causes the reciprocation of its corresponding piston; and
   a central pinion connected to said shaft, said central pinion in mesh with each of the aforementioned pinions of said plurality of pinions.

2. A driving mechanism as claimed in claim 1, wherein said assemblies are each pivotably connected to said housing at spaced apart locations around said central pinion.

3. A driving mechanism as claimed in claim 2, wherein the pivotal axes of the assemblies are positioned at ends of the cylinders of said assemblies, remote from their corresponding pinions.

4. A driving mechanism as claimed in claim 1, wherein each control valve means comprises a valve spool slidably contained in a bore of that member, each spool being connected to anchorage means on the housing.

5. A driving mechanism as claimed in claim 4, wherein each valve spool is linked to its corresponding anchorage.

6. A driving mechanism as claimed in claim 5, wherein linked connection between each valve spool and its corresponding anchorage is adjustable and there is means on said connection that maintains any chosen setting of adjustment.

7. A driving mechanism as claimed in claim 4, wherein the longitudinal axis of each control valve bore is spaced from a plane which contains the axis about which the corresponding assembly is rockable and the axis of rotation of its corresponding pinion.

8. A driving mechanism as claimed in claim 7, wherein each valve spool is slideable relative to a valve housing for the spool upon the rocking movements of its corresponding assembly taking place.

9. A driving mechanism as claimed in claim 1, wherein each piston has a reciprocable rod and each pinion of said plurality of pinions is surrounded by an eccentric ring, said assemblies being rockably mounted for displacement both during extension of their respective piston rods from their cylinders and withdrawal of those piston rods into said cylinders.

10. A driving mechanism as claimed in claim 1, wherein said output shaft includes connection means whereby it is directly connectable to the axle of a vehicle ground wheel.

11. A driving mechanism which comprises: a hydraulic fluid pump means; a non-revolving housing; a rotary power output shaft extending from said housing; a plurality of hydraulic piston and cylinder assemblies mounted in said housing, hydraulic fluid transmission conduit means connecting each of said cylinders with said hydraulic fluid pump means whereby hydraulic fluid under pressure from said hydraulic fluid pump means causes each said hydraulic piston and cylinder assembly to reciprocate; a plurality of pinions mounted in said housing which are in driving connection with said assemblies whereby each said assembly rotates at least one of said pinions; each said assembly rocking in an arc from its mounting on said housing by its reciprocating action rotating said one pinion; each said assembly having a corresponding control valve means for governing the admission of hydraulic fluid from said hydraulic fluid pump means, each said control valve means connected in part to said housing and in part to its respective assembly whereby it is actuated by the rocking thereof relative to said housing and causes the reciprocation of its corresponding piston; and a central pinion connected to said shaft in mesh with each pinion of said plurality of pinions whereby said plurality of pinions rotate said shaft in response to the reciprocating action of said assemblies, said plurality of pinions being spaced apart from one another around the said central pinion and having stationary axes relative to said housing, a hydraulic piston rod being provided in each said assembly, said rod extending in a substantially tangential relationship with said central pinion during at least part of the movement of said rod relative to said central pinion when said mechanism is viewed in the direction parallel to the axis of rotation of said shaft.

12. A driving mechanism as claimed in claim 11, wherein said pinions are each surrounded by a corresponding eccentric.

13. A driving mechanism as claimed in claim 12, wherein pinion shafts carry the eccentrics and said pinion shafts are located non-centrally with respect to the outer circumferences of the eccentrics.

14. A driving mechanism as claimed in claim 13, wherein the outer circumference of each eccentric is circular when viewed in a direction parallel to the longitudinal axis of the pinion shaft which carries same.

15. A driving mechanism as claimed in claim 14, wherein each eccentric is surrounded by a corresponding bearing.

16. A driving mechanism as claimed in claim 15, wherein each eccentric and its bearing is surrounded by a corresponding driving ring.

17. A driving mechanism as claimed in claim 16, wherein each driving unit is angularly displaceable relative to its corresponding eccentric.

18. A driving mechanism as claimed in claim 17, wherein each driving ring is connected to a corresponding piston and cylinder assembly.

19. A driving mechanism as claimed in claim 18, wherein each driving ring is fixed to a piston rod provided in its corresponding assembly.

20. A driving mechanism as claimed in claim 19, wherein the eccentrics are in driven connection with their corresponding piston and cylinder assembies.

21. A driving mechanism as claimed in claim 11, wherein the axes of rotation of said pinions are substantially parallel to the axis of rotation of said output shaft.

22. A driving mechanism as claimed in claim 21, wherein said central pinion surrounds the output shaft.

23. A driving mechanism which comprises: hydraulic fluid pump means; a non-revolving housing which encloses the mechanism; a rotary power output shaft extending from said housing; a plurality of hydraulic piston and cylinder assemblies mounted in said housing; hydraulic fluid transmission conduit means connecting each of said cylinders with said hydraulic fluid pump means whereby hydraulic fluid under pressure from said hydraulic fluid pump means causes each said hydraulic piston and cylinder assembly to reciprocate; each said hydraulic piston and cylinder assembly having a corresponding pivot axis which is stationary with respect to said housing whereby each said assembly is rockable about its corresponding pivot axis in an arc of motion; a plurality of pinions mounted in said housing which are in driving connection with said assemblies whereby each said assembly rotates at least one of said pinions; each said assembly caused to rock in an arc from its mounting on said housing by the reciprocating action which rotates said one pinion; each said assembly having a corresponding control valve means for governing the admission of hydraulic fluid communicated thereto from said hydraulic fluid pump means, each said control valve means connected in part to said housing and in part to its respective assembly whereby it is actuated by the rocking thereof relative to said housing and causes the reciprocation of its corresponding piston; and a central pinion connected to said shaft in mesh with each pinion of said plurality of pinions whereby said plurality of pinions rotate said shaft in response to the reciprocating and rocking actions of said assemblies, said plurality of pinions being spaced apart from one another around said central pinion and having stationary axes relative to said housing.

24. A driving mechanism as claimed in claim 23, wherein the pivot axis of each assembly extends substantially parallel to the axis of rotation of said output shaft.

25. A driving mechanism as claimed in claim 24, wherein each assembly has a reciprocating piston rod and the longitudinal axes of piston rods of the assemblies extend substantially perpendicular to said pivot axes.

26. A driving mechanism which comprises: hydraulic fluid pump means; a non-revolving housing; a rotary power output shaft extending from said housing; a plurality of hydraulic piston and cylinder assemblies mounted in said housing; hydraulic fluid transmission conduit means connecting each of said cylinders with said hydraulic fluid pump means whereby hydraulic fluid under pressure from said hydraulic fluid pump means causes each hydraulic piston and cylinder assembly to reciprocate; a hydraulic control valve means rigidly secured to each cylinder of said piston and cylinder assemblies which interconnects said conduit means with the corresponding said cylinder; a plurality of pinions mounted in said housing which are in driving connection with said assemblies whereby each said assembly rotates at least one of said pinions; each said assembly being caused to rock in an arc from its mounting on said housing by its reciprocating action rotating said pinion; said control valve means governing the admission of hydraulic fluid communicating thereto from said hydraulic fluid pump means, each said control valve means including a part connected to said housing whereby it is actuated by the rocking thereof relative to said housing and causes the reciprocation of its corresponding piston; and a central pinion connected to said shaft in mesh with each pinion of said plurality of pinions whereby said plurality of pinions rotate said shaft in response to the reciprocating action of said assemblies, said plurality of pinions being spaced apart from one another around said central pinion and having stationary axes relative to said housing.

27. A driving mechanism as claimed in claim 26, wherein each control member is connected for actuation by a displaceable part thereof mounted from said housing.

* * * * *